US012782913B2

(12) United States Patent
Charif et al.

(10) Patent No.: US 12,782,913 B2
(45) Date of Patent: Nov. 3, 2026

(54) PROCESS FOR GENERATING PHYSICAL IMPLEMENTATION GUIDANCE DURING THE SYNTHESIS OF A NETWORK-ON-CHIP

(71) Applicant: ARTERIS, INC., Campbell, CA (US)

(72) Inventors: Amir Charif, Paris (FR); Xavier Van Ruymbeke, Clamart (FR); Mark William Bales, Livermore, CA (US)

(73) Assignee: ARTERIS, INC., Campbell, CA (US)

( * ) Notice: Subject to any disclaimer, the term of this patent is extended or adjusted under 35 U.S.C. 154(b) by 791 days.

(21) Appl. No.: 18/305,382

(22) Filed: Apr. 24, 2023

(65) Prior Publication Data

US 2024/0353813 A1 Oct. 24, 2024

(51) Int. Cl.
*G05B 19/4097* (2006.01)

(52) U.S. Cl.
CPC .................... *G05B 19/4097* (2013.01); *G05B 2219/45026* (2013.01)

(58) Field of Classification Search
CPC .................. G05B 19/4097; G05B 2219/45026
USPC .......................................................... 716/122
See application file for complete search history.

(56) References Cited

U.S. PATENT DOCUMENTS

| | | | |
|---|---|---|---|
| 5,485,396 | A | 1/1996 | Brasen et al. |
| 5,541,849 | A | 7/1996 | Rostoker et al. |
| 5,623,420 | A | 4/1997 | Yee et al. |
| 5,638,288 | A | 6/1997 | Deeley |
| 5,761,078 | A | 6/1998 | Fuller et al. |
| 5,887,670 | A | 3/1999 | Tabata et al. |
| 5,903,886 | A | 5/1999 | Heimlich et al. |
| 5,983,277 | A | 11/1999 | Heile et al. |
| 6,002,857 | A | 12/1999 | Ramachandran |
| 6,134,705 | A | 10/2000 | Pedersen et al. |
| 6,145,117 | A | 11/2000 | Eng |
| 6,249,902 | B1 | 6/2001 | Igusa et al. |
| 6,321,363 | B1 | 11/2001 | Huang et al. |
| 6,360,356 | B1 | 3/2002 | Eng |
| 6,378,121 | B2 | 4/2002 | Hiraga |

(Continued)

FOREIGN PATENT DOCUMENTS

| | | |
|---|---|---|
| CN | 105187313 B | 5/2018 |
| CN | 109587081 A | 4/2019 |

(Continued)

OTHER PUBLICATIONS

U.S. Appl. No. 17/134,384, filed Dec. 26, 2020, Federico Angiolini.

(Continued)

*Primary Examiner* — Suchin Parihar
(74) *Attorney, Agent, or Firm* — Dana Legal Services; Jubin Dana

(57) ABSTRACT

System and methods are disclosed for augmenting a synthesized NoC, with data that guides a physical implementation of the NoC topology in a way that coincides with the topology synthesis result and reduces timing violations in the final physical design. The system generates physical implementation guidance, which is during physical implementation of the synthesized NoC. The system inserts a link as a pipeline placeholder and a minimum set of created module regions are assigned to a specific link of the topology. Each route has a new link and corresponding module region inserted into the physical path.

15 Claims, 17 Drawing Sheets

(56) References Cited

U.S. PATENT DOCUMENTS

| | | | |
|---|---|---|---|
| 6,421,321 B1 | 7/2002 | Sakagawa et al. | |
| 6,437,804 B1 | 8/2002 | Ibe et al. | |
| 6,449,761 B1 | 9/2002 | Greidinger et al. | |
| 6,622,225 B1 | 9/2003 | Kessler et al. | |
| 6,883,455 B2 | 4/2005 | Maeda et al. | |
| 6,907,591 B1 | 6/2005 | Teig et al. | |
| 7,096,436 B2 | 8/2006 | Bednar et al. | |
| 7,398,497 B2 | 7/2008 | Sato et al. | |
| 7,587,687 B2 | 9/2009 | Watanabe et al. | |
| 7,788,625 B1 | 8/2010 | Donlin et al. | |
| 8,042,087 B2 | 10/2011 | Murali et al. | |
| 8,302,041 B1 | 10/2012 | Chan et al. | |
| 8,819,611 B2 | 8/2014 | Philip et al. | |
| 9,184,998 B2 | 11/2015 | Xue | |
| 9,262,359 B1 | 2/2016 | Noice et al. | |
| 9,444,702 B1 | 9/2016 | Raponi et al. | |
| 9,569,574 B1 | 2/2017 | Khan et al. | |
| 9,589,090 B1 * | 3/2017 | Singh | G06F 30/327 |
| 9,792,397 B1 | 10/2017 | Nagaraja | |
| 9,825,779 B2 | 11/2017 | Ruymbeke et al. | |
| 9,940,423 B2 | 4/2018 | Lescure | |
| 10,068,047 B1 | 9/2018 | Finn | |
| 10,282,502 B1 | 5/2019 | BShara et al. | |
| 10,348,563 B2 | 7/2019 | Rao et al. | |
| 10,460,062 B2 | 10/2019 | Feld et al. | |
| 10,733,350 B1 | 8/2020 | Prasad et al. | |
| 10,853,545 B1 | 12/2020 | Nardi et al. | |
| 10,922,471 B2 | 2/2021 | Baeckler et al. | |
| 10,990,724 B1 | 4/2021 | Cherif et al. | |
| 11,121,933 B2 * | 9/2021 | Cherif | H04L 69/329 |
| 11,281,827 B1 | 3/2022 | Labib et al. | |
| 11,409,931 B1 * | 8/2022 | Kaur | G06F 30/333 |
| 11,449,655 B2 | 9/2022 | Cherif et al. | |
| 2003/0093765 A1 | 5/2003 | Lam et al. | |
| 2004/0010652 A1 * | 1/2004 | Adams | G06F 15/7842 710/22 |
| 2004/0040007 A1 | 2/2004 | Harn | |
| 2004/0230919 A1 | 11/2004 | Balasubramanian et al. | |
| 2005/0073316 A1 | 4/2005 | Graham | |
| 2005/0268258 A1 | 12/2005 | Decker | |
| 2007/0156378 A1 | 7/2007 | McNamara | |
| 2007/0157131 A1 | 7/2007 | Watanabe et al. | |
| 2007/0174795 A1 | 7/2007 | Lavagno et al. | |
| 2007/0186018 A1 | 8/2007 | Radulescu et al. | |
| 2008/0046854 A1 | 2/2008 | Tang | |
| 2008/0049753 A1 | 2/2008 | Heinze et al. | |
| 2008/0279183 A1 | 11/2008 | Wiley et al. | |
| 2008/0291826 A1 | 11/2008 | Licardie et al. | |
| 2009/0031277 A1 | 1/2009 | Mcelvain et al. | |
| 2009/0313592 A1 * | 12/2009 | Murali | G06F 30/30 716/113 |
| 2010/0061352 A1 | 3/2010 | Fasolo et al. | |
| 2010/0162189 A1 | 6/2010 | Lavagno et al. | |
| 2010/0218146 A1 | 8/2010 | Platzker et al. | |
| 2010/0274785 A1 | 10/2010 | Procopiuc et al. | |
| 2011/0170406 A1 | 7/2011 | Krishnaswamy | |
| 2012/0013509 A1 | 1/2012 | Wisherd et al. | |
| 2012/0311512 A1 | 12/2012 | Michel et al. | |
| 2013/0174113 A1 | 7/2013 | Lecler et al. | |
| 2013/0208598 A1 | 8/2013 | Nakaya et al. | |
| 2013/0258847 A1 | 10/2013 | Zhang et al. | |
| 2013/0283226 A1 | 10/2013 | Ho et al. | |
| 2014/0115218 A1 | 4/2014 | Philip et al. | |
| 2014/0126572 A1 | 5/2014 | Hutton et al. | |
| 2014/0153575 A1 | 6/2014 | Munoz | |
| 2014/0156826 A1 | 6/2014 | Chang et al. | |
| 2014/0160939 A1 | 6/2014 | Arad et al. | |
| 2014/0169173 A1 | 6/2014 | Naouri et al. | |
| 2014/0204735 A1 | 7/2014 | Kumar et al. | |
| 2014/0211622 A1 | 7/2014 | Kumar et al. | |
| 2014/0298281 A1 | 10/2014 | Varadarajan et al. | |
| 2014/0321839 A1 | 10/2014 | Armstrong | |
| 2015/0036536 A1 | 2/2015 | Kumar et al. | |
| 2015/0106778 A1 | 4/2015 | Mangano et al. | |
| 2015/0121319 A1 | 4/2015 | Hutton et al. | |
| 2015/0178435 A1 | 6/2015 | Kumar | |
| 2015/0254325 A1 | 9/2015 | Stringham | |
| 2015/0341224 A1 | 11/2015 | Van et al. | |
| 2015/0347641 A1 | 12/2015 | Gristede et al. | |
| 2016/0103943 A1 | 4/2016 | Xia et al. | |
| 2016/0275213 A1 | 9/2016 | Tomita | |
| 2016/0321390 A1 | 11/2016 | Bozman et al. | |
| 2017/0060204 A1 | 3/2017 | Gangwar et al. | |
| 2017/0063734 A1 | 3/2017 | Kumar | |
| 2017/0132350 A1 | 5/2017 | Janac | |
| 2017/0177778 A1 | 6/2017 | Lescure | |
| 2017/0193136 A1 | 7/2017 | Prasad et al. | |
| 2018/0115487 A1 | 4/2018 | Thubert et al. | |
| 2018/0144071 A1 | 5/2018 | Yu et al. | |
| 2018/0227180 A1 | 8/2018 | Rao et al. | |
| 2019/0012909 A1 | 1/2019 | Mintz | |
| 2019/0073440 A1 | 3/2019 | Farbiz et al. | |
| 2019/0205493 A1 * | 7/2019 | Garibay | G06F 30/398 |
| 2019/0246989 A1 | 8/2019 | Genov et al. | |
| 2019/0251227 A1 | 8/2019 | Fink | |
| 2019/0260504 A1 | 8/2019 | Philip et al. | |
| 2019/0266307 A1 * | 8/2019 | Rao | G06F 30/30 |
| 2019/0363789 A1 | 11/2019 | Lee et al. | |
| 2020/0092230 A1 | 3/2020 | Schultz et al. | |
| 2020/0162335 A1 | 5/2020 | Chen et al. | |
| 2020/0234582 A1 | 7/2020 | Mintz | |
| 2020/0366607 A1 | 11/2020 | Kommula et al. | |
| 2021/0029045 A1 * | 1/2021 | Prasad | H04L 47/2441 |
| 2021/0203557 A1 | 7/2021 | Cherif et al. | |
| 2021/0226887 A1 | 7/2021 | Mereddy | |
| 2021/0320869 A1 | 10/2021 | Bourai et al. | |
| 2021/0409284 A1 | 12/2021 | Cherif et al. | |
| 2022/0294704 A1 | 9/2022 | Lescure et al. | |
| 2026/0141145 A1 * | 5/2026 | De Lescure | G06F 30/327 |

FOREIGN PATENT DOCUMENTS

| | | | |
|---|---|---|---|
| CN | 113051215 A | 6/2021 | |
| CN | 113055219 A | 6/2021 | |
| DE | 102015014851 A1 | 5/2016 | |
| EP | 3842987 A1 | 6/2021 | |
| EP | 4024262 A1 | 7/2022 | |
| EP | 4057179 A1 | 9/2022 | |

OTHER PUBLICATIONS

U.S. Appl. No. 17/665,578, filed Feb. 6, 2022, K. Charles Janac.

"A distributed interleaving scheme for efficient access to wideIO dram memory", Seiculescu Ciprian, Benini Luca, De Micheli Giovanni, Codes+ISSS'12 (Year: 2012).

"Thread-Fair Memory Request Reordering"; Kun Fang, Nick Iliev, Ehsan Noohi, Suyu Zhang, and Zhichun Zhu; Dept. of ECE, Univeristy of Illinois at Chicago; JWAC-3 Jun. 9, 2012.

19th Asia and South Pacific Design Automation Conterence Alberto Ghiribaldi, Hervé Tatenguem Fankem, Federico Angiolini, Mikkel Stensgaard, Tobias Bjerregaard, Davide Bertozzi A Vertically Integrated and Interoperable Multi-Vendor Synthesis Flow for Predictable NoC Design in Nanoscale Technologies.

ACM ICCAD '06 Srinivasan Murali, Paolo Meloni, Federico Angiolini, David Atienza, Salvatore Carta, Luca Benini, Giovanni De Micheli, Luigi Raffo Designing Application-Specific Networks on Chips with Floorplan Information p. 8, Figure 8.

Alessandro Pinto et al, "System level design paradigms", ACM Transactions on Design Automation of Electronic Systems, ACM, New York, NY, US, (Jun. 7, 2004), vol. 11, No. 3, doi:10.1145/1142980.1142982, ISSN 1084-4309, pp. 537-563, XP058222500.

Annual IEEE International SoC Conference Proceedings Mohammad reza Kakoee, Federico Angiolin, Srinivasan Murali, Antonio Pullini, Ciprian Seiculescu, and Luca Benini A Floorplan-aware Interactive Tool Flow for NoC Design and Synthesis pp. 1, 2, 4 2009 Belfast, Northern Ireland, UK.

Anonymous: "Network on a chip—Wikipedia", Jun. 15, 2021, https://en.wikipedia.org/w/index.php?title=Network_on_a_chip&oldid=1028654828.

Bo Huang et al, "Application-Specific Network-on-Chip synthesis with topology-aware floorplanning", Integrated Circuits and Sys-

(56) References Cited

OTHER PUBLICATIONS tems Design (SBCCI), 2012 25th Symposium on, IEEE, (Aug. 30, 2012), doi:10.1109/SBCCI.2012.6344421, ISBN 978-1-4673-2606-3, pp. 1-6, XP032471227.

David Atienza et al, Network-on-Chip Design and Synthesis Outlook, Science Direct, Integration the VLSI, journal 41 (2008) 340-359.

Dumitriu Vet al: "Throughput-Oriented Noc Topology Generation and Analysis for High Performance SoCs", IEEE Transactions on Very Large Scale Integration (VLSI) Systems, IEEE Service Center, Piscataway, NJ, USA, vol. 17, No. 10, Oct. 1, 2009 (Oct. 1, 2009), pp. 1433-1446, XP011267808, ISSN: 1063-8210, DOI: 10.1109/TVLSI.2008.2004592.

Fangfa Fu et al: "A Noc performance evaluation platform supporting designs at multiple levels of abstraction", Industrial Electronics and Applications, 2009. ICIEA 2009. 4th IEEE Conference on, IEEE, Piscataway, NJ, USA, May 25, 2009 (May 25, 2009), pp. 425-429, XP031482069, ISBN: 978-1-4244-2799-4 abstract p. 426-p. 429.

Francesco Robino: "A model-based design approach for heterogeneous NoC-based MPSoCs on FPGA", Jul. 1, 2014 (Jul. 1, 2014), XP002806918, Retrieved from the Internet: URL: http://www.divaportal.org/smash/get/diva2:718518/FULLTEXT02.pdf [retrieved on Jun. 22, 2022].

Haytham Elmiligi et al: "Networks-on-chip topology optimization subject to power, delay, and reliability constraints", IEEE International Symposium on Circuits and Systems. May 30, 2010, pp. 2354-2357, DOI: 10.1109/ISCAS.2010.5537194.

Jain R et al: "Predicting system-level area and delay for pipelined and nonpipelined designs", IEEE Transactions on Computer Aided Design of Integrated Circuits and Systems, vol. 11, No. 8, Jan. 1, 1992, pp. 955-965, DOI: 10.1109/43.149767.

Jean-Jacques Lecler et al: Application driven network-on-chip architecture exploration & refinement for a complex SoC, Design Automation for Embedded Systems, vol. 15 No. 2, Apr. 7, 2011, DOI: 10.1007/S10617-011-9075-5.

Jingye Xu et al: "Latch Based Interconnect Pipelining for High Speed Integrated Circuits", Proceedings of the International Conference on Electro/Information Technology, May 1, 2006, pp. 295-300, DOI: 10.1109/EIT.2006.252152.

Jun Minje et al: "Exploiting Implementation Diversity and Partial Connection of Routers in Application-Specific Network-on-Chip Topology Synthesis", IEEE Transactions on Computers, IEEE, USA, vol. 63, No. 6, Jun. 1, 2014 (Jun. 1, 2014), pp. 1434-1445, XP011550397, ISSN: 0018-9340, DOI: 10.1109/TC.2012.294.

K. R. Manik et al., "Methodology for Design of Optimum NOC Based on I PG," 2017 Int'l Conference on Algorithms, Methodology, Model and Applications in Emerging Technologies (ICAMMAET), Chennai, India, IEEE, 6 pages. (Year: 2017).

Luca Benini: "Application specific Noc design", Design, Automation and Test in Europe, 2006, Date '06 : Mar. 6-10, 2006, [Munich, Germany; Proceedings] / [Sponsored by the European Design and Automation Association], IEEE, Piscataway, NJ, USA, Mar. 6, 2006 (Mar. 6, 2006), pp. 491-495, XP058393584, ISBN: 9783981080100.

Murali et al: "Synthesis of Predictable Networks-on-Chip-Based Interconnect Architectures for Chip Multiprocessors", IEEE Transactions on Very Large Scale Integration (VLSI) Systems, IEEE Service Center, Piscataway, NJ, USA, vol. 15, No. 8, Aug. 1, 2007 (Aug. 1, 2007) , pp. 869-880, XP011187732, ISSN: 1063-8210, DOI: 10.1109/TVLSI.2007.900742.

Partha et al., Design, Synthesis, and Test of Networks on Chips, IEEE (Year: 2005).

Picornell Tomas tompic@gap.upv.es et al: "DCFNoC a Delayed Conflict-Free Time Division Multiplexing Network on Chip", Designing Interactive Systems Conference, ACM, 2 Penn Plaza, Suite 701 New York NY10121-0701 USA, Jun. 2, 2019 (Jun. 2, 2019), pp. 1-6, XP058637807, DOI: 10.1145/3316781.3317794 ISBN: 978-1-4503-5850-7.

Saponara S et al: "Design and coverage-driven verification of a novel network-interface IP macrocell for network-on-chip interconnects", Microprocessors and Microsystems, vol. 35, No. 6 , pp. 579-592, XP028255708, ISSN: 0141-9331, DOI: 10.1016/J.MICPRO. Jun. 5, 2011.

Saponara Sergio et al: "Configurable network-on-chip router macrocells", Microprocessors and Microsystems, IPC Business Press Ltd. London, GB, vol. 45, Apr. 29, 2016 (Apr. 29, 2016), pp. 141-150, XP029678799, ISSN: 0141-9331, DOI: 10.1016/J.MICPRO.2016.04.008.

Song Z et al: "A NOC-Based High Performance Deadlock Avoidance Routing Algorithm", Computer and Computational Sciences, 2008. IMSCCS '08. International Multisymposiums on, IEEE, Piscataway, NJ, USA, Oct. 18, 2008, pp. 140-143, XP031411025, ISBN: 978-0-7695-3430-5.

Srinivasan K et al, "Linear programming based techniques for synthesis of network-on-chip architectures", Computer Design: VLSI in Computers and Processors, 2004. ICCD 2004. Pr Oceedings. IEEE International Conference on San Jose, CA, USA Oct. 11-13, 2004, Piscataway, NJ, USA, IEEE, (Oct. 11, 2004), doi: 10.1109/ICCD.2004.1347957, ISBN 978-0-7695-2231-9, pp. 422-429, XP010736641.

Srinivasan Murali et al: "Mapping and physical planning of networks-on-chip architectures with quality-of-service guarantees", Proceedings of the 2005 Asia and South Pacific Design Automation Conference, Jan. 18, 2005, DOI: 10.1145/1120725.1120737.

Tobias Bjerregaard et al: "A Router Architecture for Connection-Oriented Service Guarantees in the Mango Clockless Network-on-Chip", Proceedings of the IEEE Conference and Exhibition on Design, Automation, and Test in Europe, Mar. 7, 2005, DOI: 10.1109/DATE.2005.36.

Wei Zhong et al: "Floorplanning and Topology Synthesis for Application-Specific Network-on-Chips", IEICE Transactions on Fundamentals of Electronics< Communications and Computer Sciences, Jun. 1, 2013, DOI: 10.1587/TRANSFUN.E96.A.1174.

Zhou Rongrong et al: A Network Components Insertion Method for 3D Application-Specific Network-on-Chip, Proceedings of the 11th IEEE International Conference on ASIC, Nov. 3, 2015, pp. 1-4, DOI: 10.1109/ASICON.2015.7516952.

Chaari Moomen Moomen chaari@infineon Com et al: "A model-based and simulation-assisted FMEDA approach for safety-relevant E/E systems", Proceedings of the 34th ACM SIGMOD-SIGACT-SIGAI Symposium on Principles of Database Systems, ACMPUB27, New York, NY, USA, Jun. 7, 2015 (Jun. 7, 2015), pp. 1-6, XP058511366, DOI: 10.1145/2744769.2747908 ISBN: 978-1-4503-3550-8.

Mariani R et al: "Fault-Robust Microcontrollers for Automotive Applications", On-Line Testing Symposium, 2006. IOLTS 2006. 12th IEEE International Como, Italy Jul. 10-12, 2006, Piscataway, NJ, USA, IEEE, Jul. 10, 2006 (Jul. 10, 2006), pp. 213-218, XP010928275, DOI: 10.1109/IOLTS.2006.38 ISBN: 978-0-7695-2620-I.

Anonymous: "Intel Hyperflex Architecture HighPerformance Design Handbook", Oct. 4, 2021 (Oct. 4, 2021), pp. 1-147, XP093063924, Retrieved from the Internet: URL:https://cdrdv2.intel.com/vl/dl/getContent/667078?fileName=sl0_hp_hb-683353-667078.pdf.

James C. Tiernan. 1970. An efficient search algorithm to find the elementary circuits of a graph. Commun. ACM 13, 12 (Dec. 1970), 722-726. https://doi.org/10.1145/362814.362819.

Ken Eguro et al.: "Simultaneous Retiming and Placement for Pipelined Net lists", Proceedings of the 16th International Symposium on Field-Programmable Custom Computing Machines, Apr. 14, 2008 (Apr. 14, 2008), pp. 139-148, XP031379339.

* cited by examiner

600

- 3 master NIUs
- 5 target NIUs
- 3 traffic class labels:
  - BE
  - LL
  - BW
- Hence 3 main switches
- Connectivity + labels:

| | S1 | S2 | S3 | S4 | S5 |
|---|---|---|---|---|---|
| M1 | BE | | BE | LL | |
| M2 | | BE | BE | LL | BW |
| M3 | LL | | | BW | |

PROCESS FOR GENERATING PHYSICAL IMPLEMENTATION GUIDANCE DURING THE SYNTHESIS OF A NETWORK-ON-CHIP

TECHNICAL FIELD

The present technology is in the field of electronic system design and, more specifically, related to physical implementation guidance during generation of a network-on-chip (NoC).

BACKGROUND

Multiprocessor systems have been implemented in systems-on-chips (SoCs) that communicate through NoCs. The SoCs include instances of initiator intellectual properties (IPs) and target IPs. Transactions, in the form of packets, are sent from an initiator to one or more targets using industry-standard protocols. The initiator, connected to the NoC, sends a request transaction to a target, using an address to select the target. The NoC decodes the address and transports the request from the initiator to the target. The target handles the transaction and sends a response transaction, which is transported back by the NoC to the initiator.

For a given set of performance requirements, such as connectivity and latency between source and destination, frequency of the various elements, maximum area available for the NoC logic and its associated routing (wiring), minimum throughput between sources and destinations, power consumption requirements for the NoC, and position on the floorplan of elements attached to the NoC, it is a complex task to create an optimal NoC that fulfills all the requirements with a minimum amount of logic and wires. This is typically the job of the chip architect or chip designer to create this optimal NoC, and this is a difficult and time-consuming task. In addition to this being a difficult task, the design of the NoC is revised every time one of the requirements changes, such as modifications of the chip floorplan, addition or deletion of IP components, or modification of the expected performance. As a result, this task needs to be redone frequently over the design time of the chip. This process is time consuming, which results in production delays. Therefore, what is needed is a system and method to efficiently generate a NoC from a set of constraints, which are listed as requirements, and a set of inputs. The system needs to produce the NoC with all its elements placed on a floorplan of a chip.

A current technical problem with creating a NoC is that physical floorplan information is not available. For example, if two components that are logically plugged into the network in an adjacent configuration, or logically next to each other, they may go through a single switch to implement communication between the two components. However, on the physical floorplan, the two components may be far away from each other. As a result, it may be difficult and/or even impossible to meet the timing requirements once the NoC is being implemented in the body of the actual floor plan. The timing requirements are passed to a downstream tool. Timing requirements set forth parameters, for example, between Component A and Component B. For example, the timing between Component A and Component B must be a value within a range. If the value measured from Component A to Component B exceeds the value range of the timing requirements, when Component A is too far away from Component B, as it is currently known for the downstream tools to be overworked when working longer than normal times in an attempt to satisfy a time requirement that is essentially not satisfiable. Thus, it would be more desirable to create a NoC that the downstream tools can successfully implement while satisfying all the timing, power, area, and congestion design constraints.

SUMMARY

In accordance with various embodiments and aspects of the invention, a process for generating implementation guidance during the synthesis of a NoC is described. Systems and methods are disclosed that generate a NoC using constraints and steps with inputs to produce or generate the NoC with all its elements. The elements of the NoC are placed on a floorplan of a chip. An advantage of the invention is simplification of the design process and the work of the chip architect or designer. Further, technical solutions that provide a technical effect enabling creating a NoC in a manner that by virtue of having an indication of the physical floorplan, it is easier to automate a mechanism such as including, but not limited to, the addition of a distance pipe component, as compared to current techniques.

In an embodiment, creating a synthesized NoC is configured to: augment the NoC with information to ensure that as it is implemented in the downstream tools and that it meets the performance criteria that was supplied in the specification for the NoC; and to provide an indication of the floorplan so that timing estimation may be implemented to determine the how far apart a first component is from a second component. The timing estimation may provide data indicating that, for example, the first component of a NoC is too far apart from the second component of a NoC and exceeds the timing requirement. As a result of the exceeding of the timing requirement, at least one distance pipeline or link may be inserted into the floorplan. An addition of a distance pipe into the floorplan solves many of the problems associated with two components of the NoC exceeding the timing requirement. However, the addition of a distance pipe to the floorplan of a NoC contributes to added latency in that it adds a clock cycle for data to traverse through the distance pipe. It is more desirable to simultaneously add a distance pipe and create NoC topology that does not require distance pipes as much as possible. As a result, the overall performance, bandwidth and latency may be optimized given the constraints of a floorplan.

DETAILED DESCRIPTION

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future.

As used herein, a transaction may be a request transaction or a response transaction. Examples of request transactions include write request and read request.

As used herein, a node is defined as a distribution point or a communication endpoint that is capable of creating, receiving, and/or transmitting information over a communication path or channel. A node may refer to any one of the following: switches, splitters, mergers, buffers, and adapters. As used herein, splitters and mergers are switches; not all switches are splitters or mergers. As used herein and in accordance with the various aspects and embodiments of the invention, the term "splitter" describes a switch that has a single ingress port and multiple egress ports. As used herein and in accordance with the various aspects and embodiments of the invention, the term "merger" describes a switch that has a single egress port and multiple ingress ports.

Figure 1A:
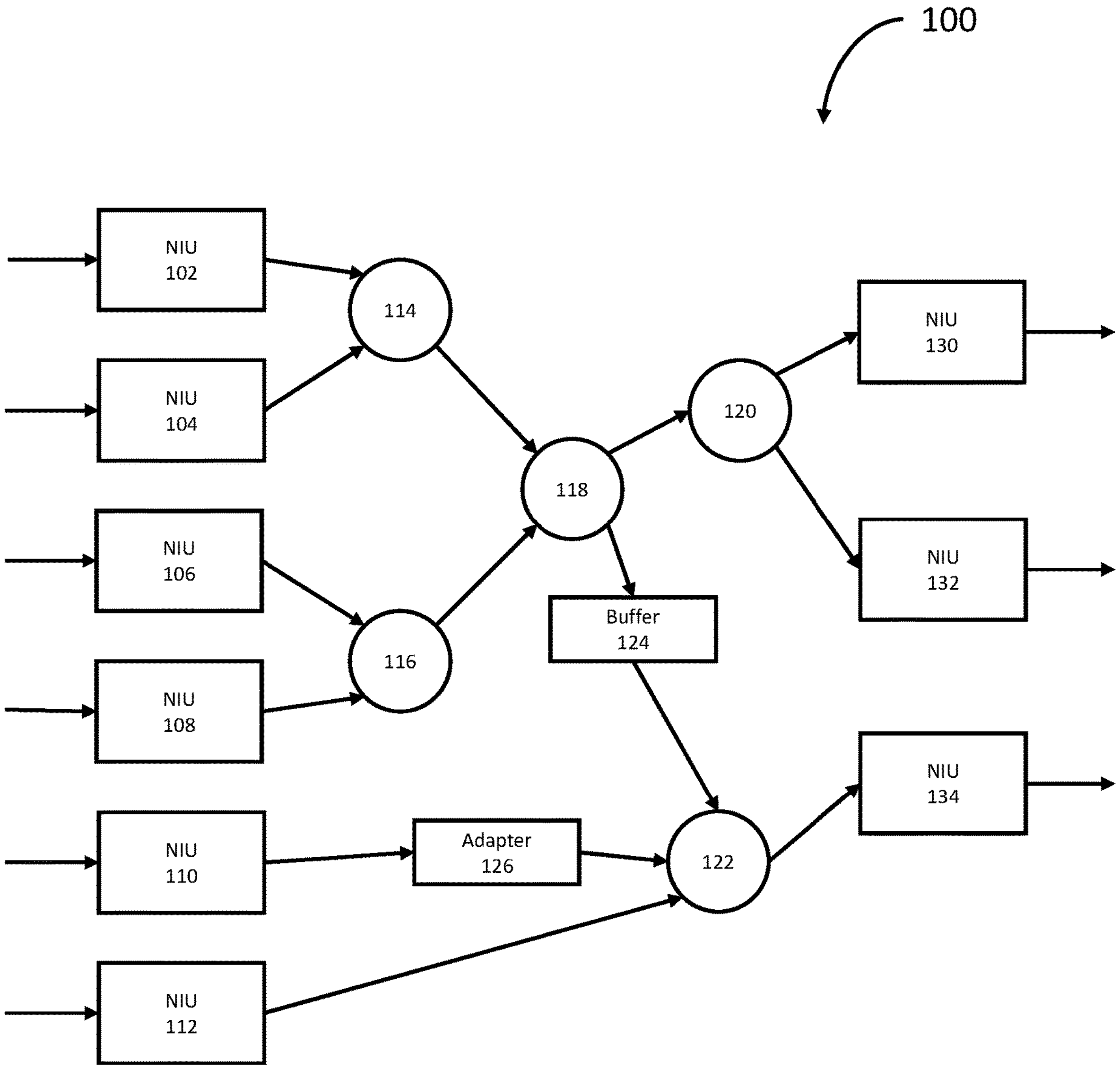
FIG. 1A shows a logic view of a NoC that includes various elements that create the NoC.

Referring now to FIG. 1A, a NoC 100 is shown in accordance with various aspects and embodiments of the invention. The NoC 100 is one example of a network. In accordance with various aspects and embodiments of the invention, a network includes a set of nodes and set of edges, each of these has a model and can be used at the heart of the synthesis to perform and implement transformation over the network and converge to the best solution fitting the specified requirements. The NoC 100 includes nodes and endpoints and uses elementary network functions that are assembled, such as: network interface units (NIUs, also called AIUs or Agent Interface Units) 102, 104, 106, 108, 110, 112, 130, 132, and 134, nodes/switches 114, 116, 118, 120, and 122; adapters, such as adapter 126; and buffers, such as buffer 124. The NoC elementary network functions use an internal transport protocol, which is specific to the NoC 100, to communicate with each other, typically based on the transmission of packets. The NIUs convert the protocol used by the attached SoC unit (not shown), into the transport protocol used inside the NoC 100. The switches are configured to route flows of traffic between source and destinations. The buffer 124 is used to insert pipelining elements to span long distances, or to store packets to deal with rate adaptation between fast senders and slow receivers or vice-versa. The adapter 126 handles various conversions between data width, clock and power domains. It is within the scope of this invention for the transport protocol to include, but not be limited to, a proprietary and/or an industry-standard protocol.

Figure 1B:
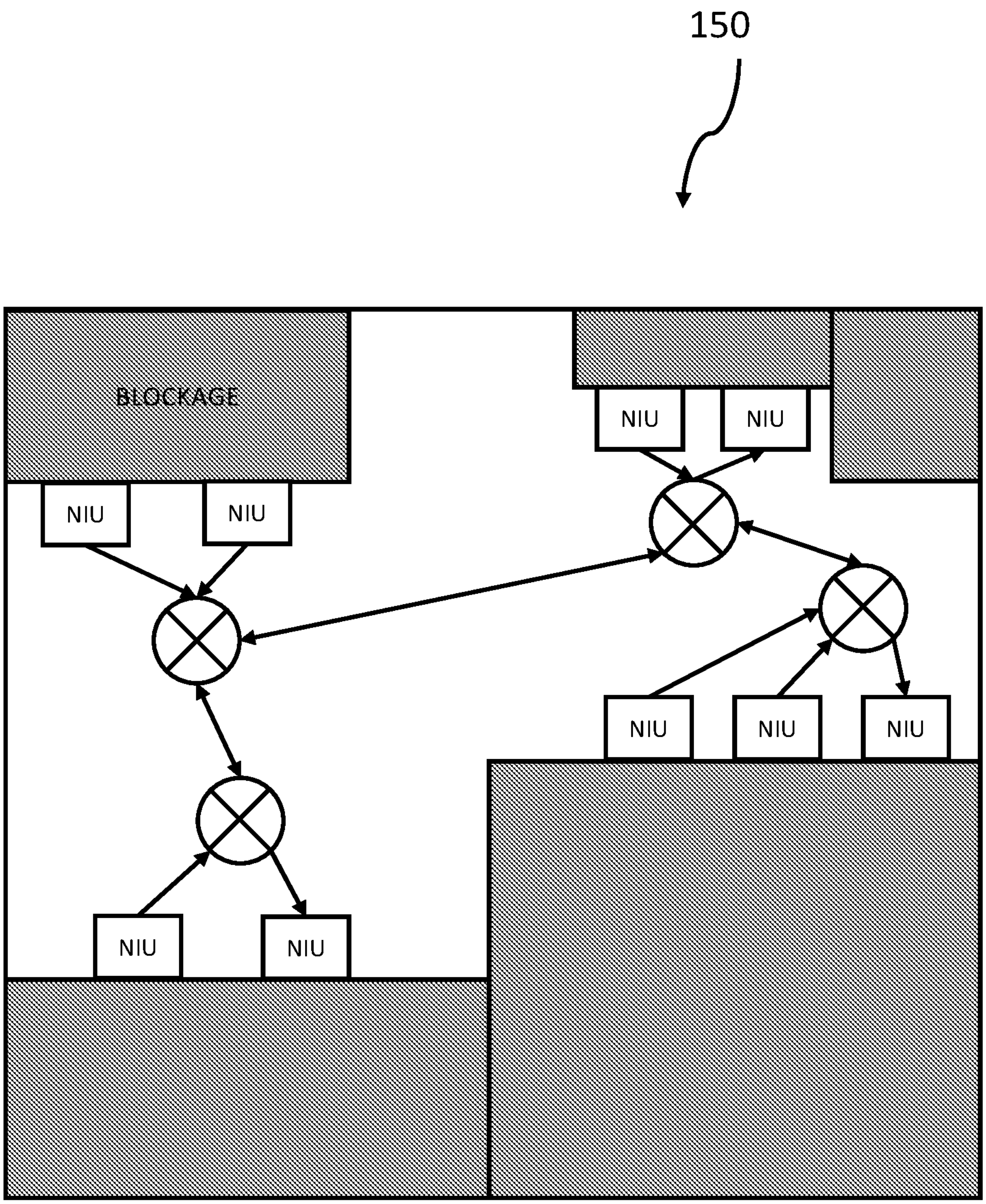
FIG. 1B shows a NoC with elements placed on a floorplan of a network.

Referring now to FIG. 1B, a NoC 150 is shown with various elements, such as NIUs, switches, and blockage areas in the floorplan. The NoC 150 includes various connectivity elements through various switches. In accordance with one aspect of the invention, a set of constraints are used as input to the tool, which is discussed in greater detail below. In accordance with some aspects of the invention, the tool executes a set of sub-steps and produces the description (synthesis) of a resulting NoC, such as the NoC 150, with its configured elements and the position of each element on the floor plan. The generated description is used to actually implement the NoC hardware, using the physical information produced to provide guidance to the back-end implementation flow. It is within the scope of the invention for the NoC components to be abstractions of what will become a much larger number of semiconductor gates in the SoC. It is also an important aspect for a component to have a location such as a center of mass for the individual gates. The individual gates may comprise the component and which will be placed and routed by the downstream tools.

Figure 2A:
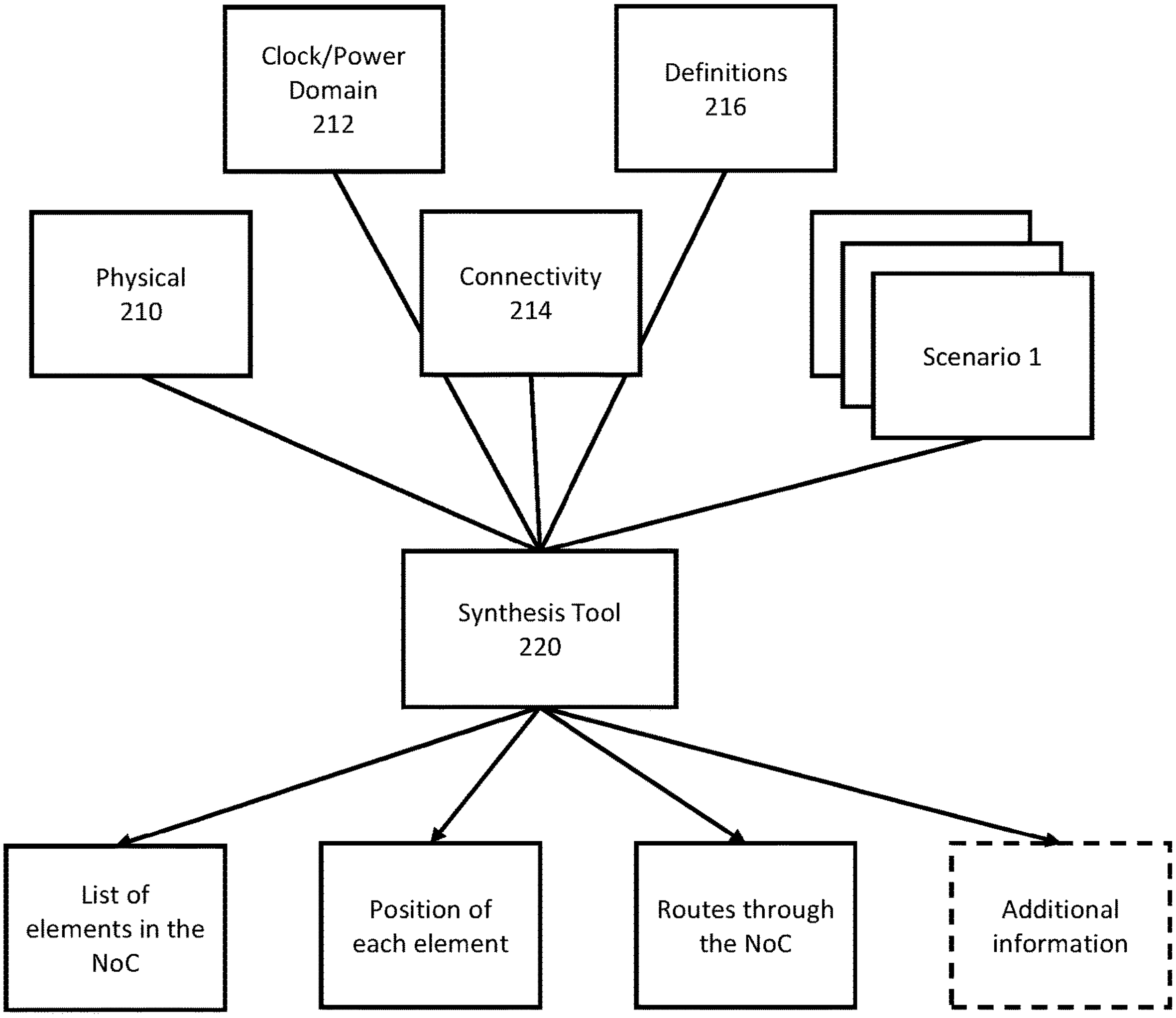
FIG. 2A shows a method for generating a NoC description based on a set of constraints in accordance with various aspects and embodiments of the invention.

Referring now to FIG. 2A, in accordance with some aspects of the invention, a set of constraints (210, 212, 214, 216, and Scenarios) are provided to a synthesis tool 220. In accordance with some embodiments and aspects of the invention, the performance and function of the tool 220 may include third-party ASIC implementation tools such as logic synthesis, place and route back end tools, and so on. A designer and/or user builds the set of constraints that are provided to the tool 220. The constraints are captured in machine-readable form, such as computer files using a defined format to capture information that is understood and processed by the tool. In accordance with one aspect of the invention the format is XML. In accordance with another aspect of the invention the format is JSON. The scope of the invention is not limited by the specific format used.

Figure 2B:
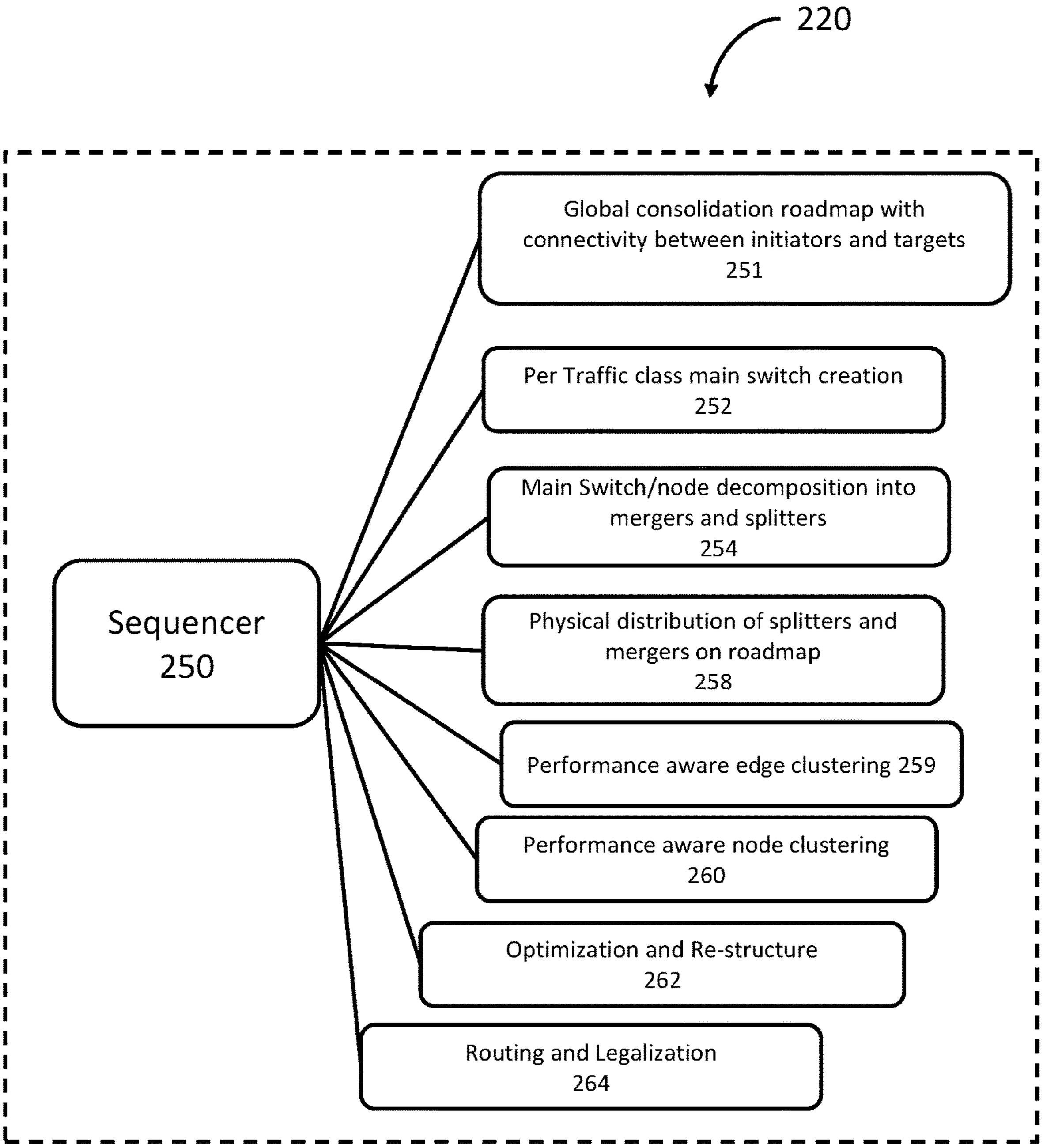
FIG. 2B shows a block diagram of a NoC synthesis tool in accordance with various aspects and embodiments of the invention.

Referring now to FIG. 2B, the tool reads the files containing the description of the constraints and executes the synthesis process. In accordance with some aspects of the invention, the synthesis process is broken down into multiple steps. A sequencer 250 is responsible for executing each step of the process. In accordance with some aspects of the invention, a set of steps are executed by the sequencer 250 of the tool 220 in light of the constraints set forth by the user/designer. The scope of the invention is not limited by the number and kind of steps the sequencer 250 may call and execute.

Referring again to FIG. 2A along with FIG. 2B, in accordance with the various aspects of the invention, the designer of the network provides and defines a set of constraints, such as constraints 210, 212, 214, and 216. A sequencer 250 receives various inputs, including: input 251 that includes global consolidation roadmaps with connectivity between initiators and targets including roadmap creation and information between each initiator and target; input 252 that includes traffic classification and main switch creation; input 254 that includes main switch decomposition into mergers and splitters; input 258 that includes information about physical distribution of splitters and mergers in the roadmap; input 259 that includes information about edge clustering; and input 260 that includes information about performance aware node clustering. In accordance with one aspect of the invention, the sequencer 250 also receives input 262 that includes information about optimization and network restructuring. In accordance with one aspect of the invention, the sequencer 250 receives 264 that includes information about routing and legalization. In accordance with various aspects and embodiments of the invention, the sequencer 250 uses all the inputs 251-264 to generate the network. In accordance with various aspects and embodiments of the invention, the sequencer 250 uses a combination of the inputs 251-264 to generate the network.

In accordance with the various aspects of the invention, input 251 includes input about the global consolidation roadmap. The global consolidation roadmap includes a consolidation model that captures the global physical view of the connectivity of the floorplan's free space, as well as the connectivity across/between the initiators and targets. The global consolidation roadmap is modeled by a graph of physical nodes and canonical segments that are used to position the nodes (splitters, mergers, switches, adapters) of the network under construction. The global consolidation roadmap is used to fasten computation. In accordance with various aspects of the invention, the global consolidation roadmap is persistent, which means that it is data the system exports and re-consumes in incremental synthesis and subsequent runs.

In accordance with some aspects of the invention, input 259 includes information about edge clustering. Edge clustering aims to minimize resources and enhance performance goals through proper algorithms and techniques. In accordance with some aspects of the invention, edge clustering is applied in conjunction and in cooperation with input 260, node clustering. Edge clustering and node clustering can be used in combination by mixing, by being applied concurrently, or by being applied in sequence. The advantage and goal is to expand the spectrum of synthesis and span a larger solution space for the network.

In accordance with various aspects of the invention, input 262 includes information about restructuring. Re-structuring includes a variety of transformations and capabilities. In accordance with some aspects of the invention, the transformations are logical in that there is a change in structure of the network. In accordance with some aspects of the invention, the transformation is physical because there is a physical change in the network, such as moving a node to a new location. Other examples of restructuring include: breaking a node into smaller nodes; reparenting between nodes; network sub-part duplication to avoid deadlocks and to deal with congestion; and physically re-routing links to avoid congestion areas or to meet timing constraints.

In accordance with the various aspects of the invention, another constraint includes extension of the clock domain and power domain 212 can also be provided. The domain 212 includes areas of the chip where logic belonging to a particular domain is allowed to be placed.

Figure 3:
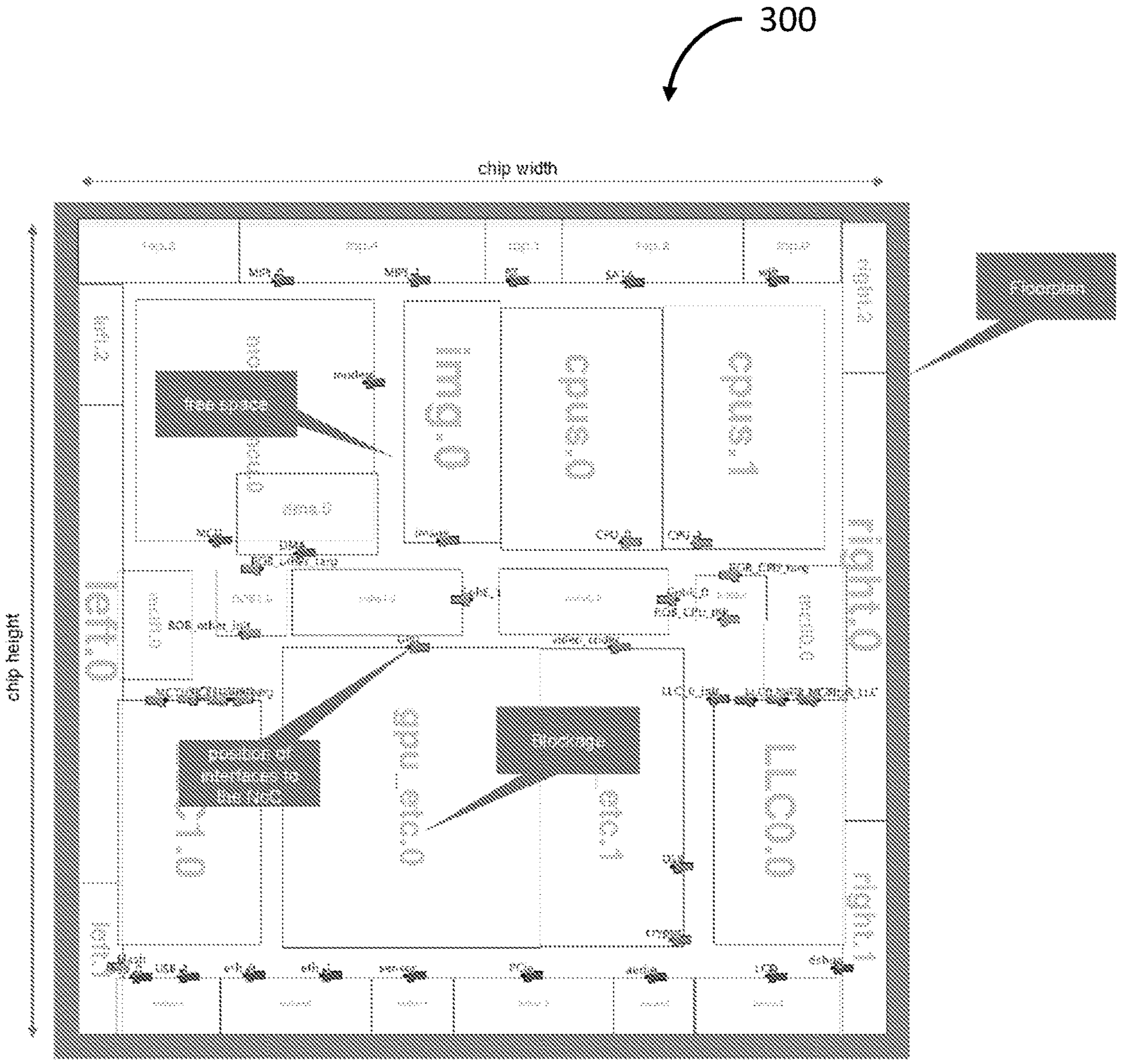
FIG. 3 shows a graphical view of the floorplan of a chip with blockage areas and positions of interface to the NoC in accordance with various aspects and embodiments of the invention.

Referring now to FIG. 3, in accordance with the various aspects of the invention, a floorplan 300 of the chip onto which the NoC is implemented is shown, with positions for various initiator interfaces and target interfaces. The physical constraint 210 provides physical information about the design that includes: the size of the chip onto which the NoC will be implemented; the various blockages areas on the floor plan, which are rectangles representing area of the chip onto which the NoC logic cannot exist or be placed; the free space, which is area of the chip where the NoC logic can exist and is defined by area not covered by a blockage; and the position of the interfaces between the SoC units and the NoC, which is the position of the initiator interfaces and the targets interfaces, such as NIUs. The blockages may be represented at the top level of the floorplan, or they may be contained in a hierarchical representation of the physical/logical blocks within the design and are then used at the top level in the same fashion.

In accordance with the various aspects of the invention, capabilities of the logic library, which will be used to implement the NoC, are provided. The information includes the size of a reference logic gate, and the time it takes for a signal to cover a 1 mm distance.

Referring again to FIG. 2A, in accordance with the various aspects of the invention, a SoC includes multiple clock domains and multiple power domains. A clock domain is defined by all the logic fed by a given clock input. The clock input is characterized by the frequency of the clock, which is its most important parameter. A power domain is defined by all the logic getting power supply from the same power source. In accordance with the various aspects of the invention, the power source is gated, thus, the power domain can be on or off or isolated from other power domains. As such, the designer provides the set of clock domain and power domain constraints 212 as part of the initial design.

In accordance with the various aspects of the invention, initiators and targets are communicatively connected to the NoC. An initiator is a unit that sends requests. An initiator typically is configured to read and write commands. A target is a unit that serves or responds to the requests. A target typically is configured to read and write commands. Each initiator is attached to or connected to the NoC through a NIU. The NIU that is attached to an initiator is called an Initiator Network Interface Unit (INIU). Further, each target is attached to the NoC through an NIU. The NIU that is attached to a target is called a Target Network Interface Unit (TNIU). The primary functionality of the NoC is to carry each request from an initiator to the desired destination target, and if the request demands or needs a response, then the NoC carries each target's response to the corresponding requesting initiator. Initiators and targets have many different parameters that characterize them. In accordance with the various aspects of the invention, for each initiator and target, the clock domain and power domain they belong to are defined. The width of the data bus they use to send, write, and receive read payloads is a number of bits. In accordance with the various aspects of the invention, the width of the data bus for the connection (the communication path to/from a target) used to send, write requests, and receive write responses are also defined. Furthermore, the clock and power domain definition are a reference to the previously described clock and power domains existing in the SoC, as described herein.

Figure 4:
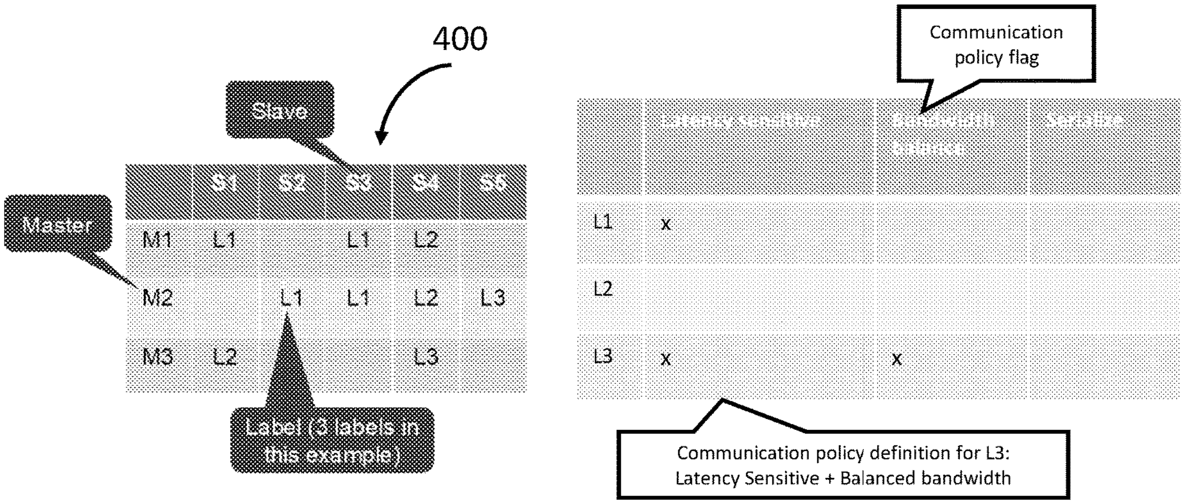
FIG. 4 shows a connectivity table of a NoC in accordance with the various aspects and embodiments of the invention.

Continuing with FIG. 2A and FIG. 2B and referring also to FIG. 4, a connectivity table 400 is shown. In accordance with the various aspects of the invention, the table 400 allows for traffic to be defined by classification. The tool permits using a traffic class label for each connection between an initiator and a target. As shown in table 400, there are three traffic classes: L1, L2, and L3. A traffic class label is an arbitrary label, chosen by the user or designer. Any number of labels can be defined and the scope of the invention is not limited by the number of labels. Each label represents the need for independent network resources. Each label will be given a distinct sub-network by the invention, which can be physically different, or use virtual networks, if supported by the underlying NoC technology.

In accordance with the various aspects of the invention, initiators are not required to be able to send requests to all targets or targets that are connected to the NoC. The precise definition of the target that can receive requests from an initiator is outlined or set forth in the connectivity table, such as table 400. The connectivity and traffic class labeling information can be represented as an explicit or conceptual matrix. Each initiator has a row and each target has a column. If an initiator must be able to send traffic to a target, a traffic class label must be present at the intersection between the initiator row and the target column. If no label is present at an intersection, then the tool does not need connectivity between that initiator and that target. For example, initiator 1 (M1) is connectively communicating with target 1 (S1) using a defined label 1 (L1) while M1 does not communicate with S2 and hence there is no label in the intersection of M1 and S2. In accordance with the various aspects of the invention, the actual format used to represent connectivity can be different, as long as each pair of initiator-target combination has a precise definition of its traffic class, or no classification label if there is no connection. It is within the scope of this invention for an initiator/target connection to support a plurality of traffic classes.

Figure 5:
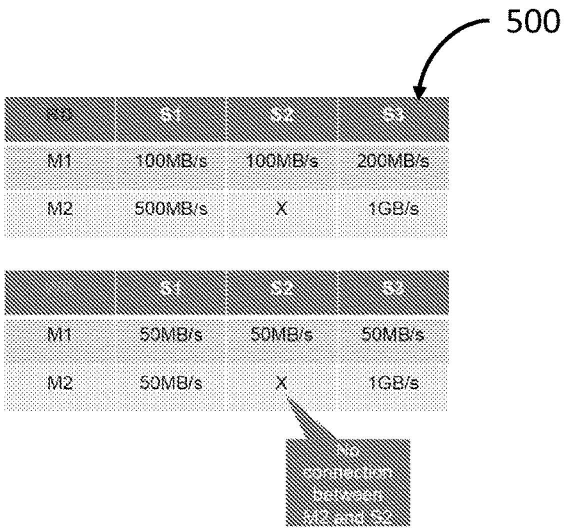
FIG. 5 shows a scenario table with throughput definitions for read and write transactions in accordance with the various aspects and embodiments of the invention.

Referring now to FIG. 5, a table 500 is shown in accordance with the various aspects of the invention, that includes various scenarios (shown in FIG. 2A) for read (RD) and write (WR) transactions. The table 500 includes information that define the various throughput rates provided to the tool. A scenario defines the expected performance in terms of throughput of data between an initiator and a target. Each scenario describes the expected required read bandwidth and the expected required write bandwidth between each initiator and each target. Throughput is defined in bytes-per-second (B/s). A typical SoC will have multiple modes of operations. As an example, a SoC for a smartphone might have a gaming mode of operation, an audio call mode of operation, an idle mode of operation and so on. These define scenarios that depend on different throughput rates. Thus, a set of scenarios represents the different modes of operation the SoC supports and, correspondingly, the expected NoC minimum performance in terms of throughput between initiators and targets.

A scenario can be represented as 2 matrixes, one defining read throughputs and one defining write throughputs. In accordance with the various aspects of the invention, read throughput requirements will be used to size the response network, which handles data returning from targets back to the initiator. Write throughput requirements will be used to size the request network, which is data going from initiator to target, in accordance with the various aspects of the invention. An example, in accordance with the various aspects of the invention, of the throughput requirements for the various scenarios is shown in table 500. The actual format used to represent a scenario can be different, as long as each pair of (initiator, target) has a precise definition of its minimum required throughput for read and for write. In table 500, read transaction from M1 to S1 has a minimum performance throughput of 100 MB/s. In table 500, a write transaction from M1 to S1 has a minimum throughput of 50 MB/s.

It is within the scope of this invention for latency to refer to the number of clock cycles it takes for data to make its way through the network. Latency causes problems in transport networks despite having a high-bandwidth (frequency). An example of a "real-time traffic class" would be video data from a camera in a self-driving car. It isn't acceptable to have long latency in the propagation of the data. If some data were lost it would make the vehicle unsafe. A still real-time but less vital traffic class would be for audio and/or video in the entertainment system. It would not be desirable to have a gap in that data, but not unsafe. An example of non-real-time data would be data from a gas gauge sensor in a car. If the data is delayed for several seconds, it is of no matter since the rate of change of the data is quite slow compared to the operating speed of an SoC.

In accordance with some aspects of the invention, scenarios are not defined for the tool, in which case the tool optimizes the NoC synthesis process for physical cost, such as lowest gate cost and/or lowest wire cost.

Figure 6:
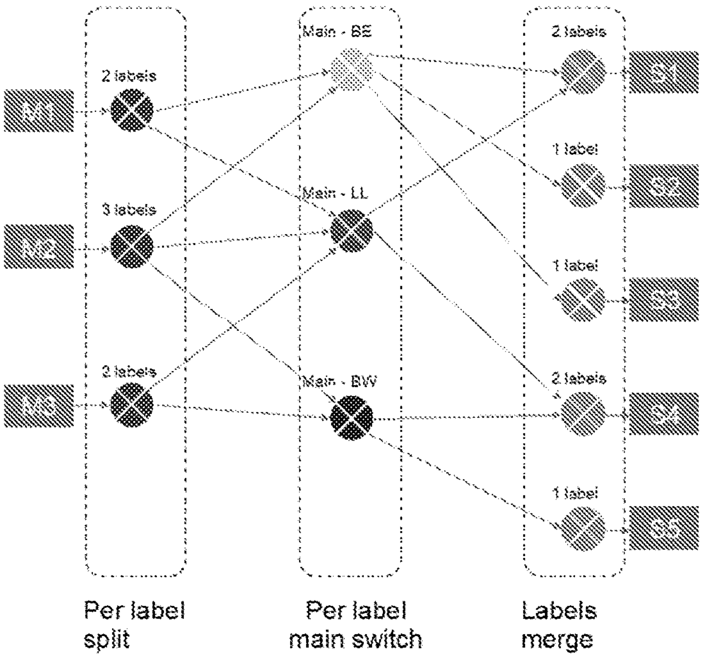
FIG. 6 shows creation of a network with 3 traffic classes in accordance with the various aspects and embodiments of the invention.

Referring now to FIG. 6 along with FIG. 2B, an initial network 600 is created in accordance with the various aspects of the invention. The network 600 implements the connectivity matrix with the following defined parameter or components:

- one network interface unit per initiator,
- one network interface unit per target,
- one switch is created per defined traffic class, called the main switch of the class,
- one switch after each initiator/initiator NIU that split traffic to the different main switches that this initiator needs to reach, one switch before each target/target NIU that merges traffic from the different main switches that are sending traffic to that target The data width of each switch, and the clock domain it belongs to, is computed using the data width of each attached interface, and their clock domain, as inputs to the tool. In accordance with the various aspects of the invention, each step that transforms the network, which is part of the NoC, also performs the computation of the data width and the clock domain of the newly created network elements.

Figure 7:
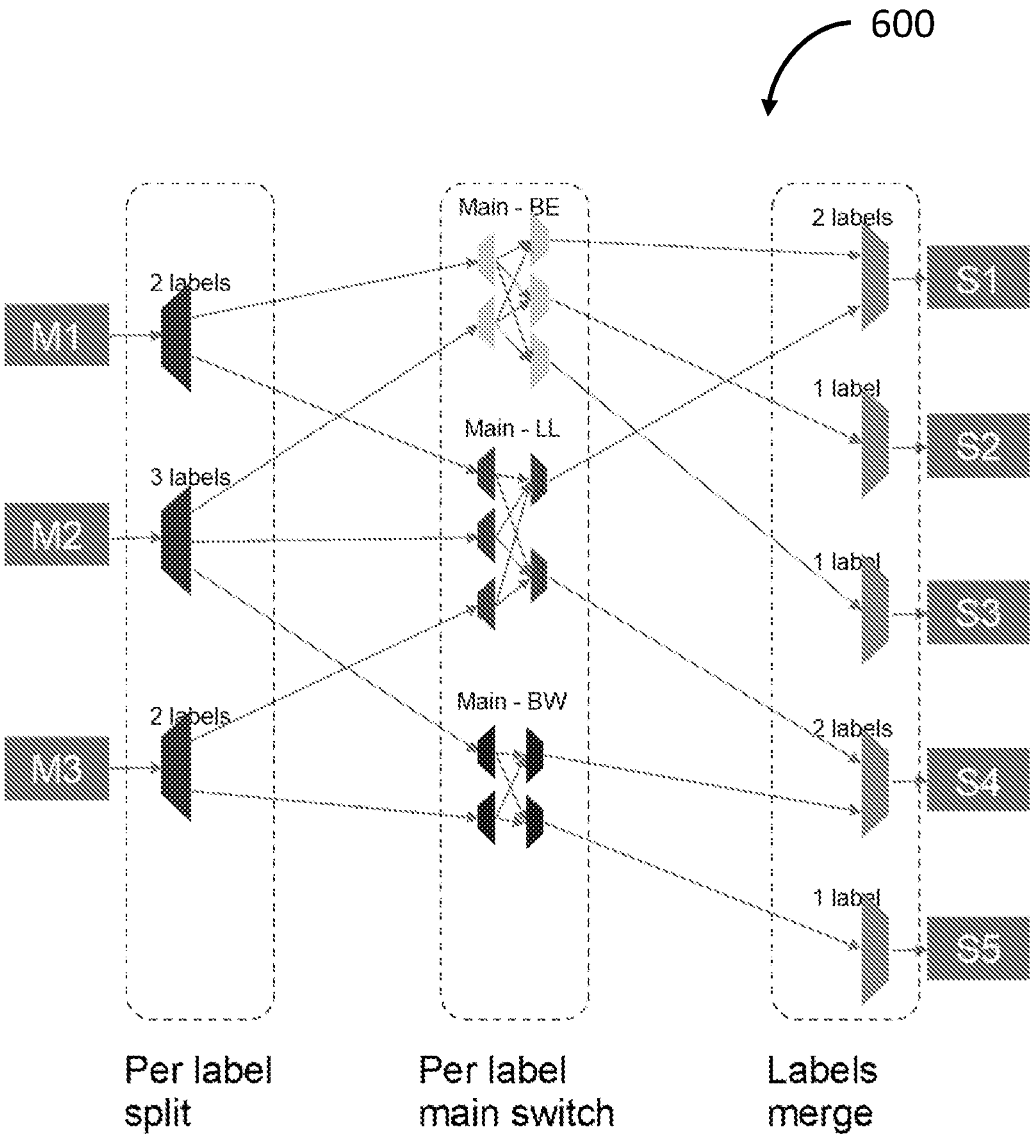
FIG. 7 shows decomposition of the network of FIG. 6 with mergers and splitters in accordance with the various aspects and embodiments of the invention.

Referring now to FIG. 7 and FIG. 2B, the network 600 of FIG. 6 is shown wherein the tool's process transforms the network 600 in accordance with the various aspects of the invention. The sequencer 250 has an input 254 representing the main switch decomposition into mergers and splitters. The tool decomposes each main switch of the network 600 into its equivalent implementation with splitters and mergers. In accordance with the various aspects of the invention, some switches have a single ingress port and multiple egress ports. In accordance with the various aspects of the invention, some switches have multiple ingress ports and a single egress port. Each main switch ingress port is connected to a splitter, each main switch egress port is connected to a merger. For a main switch, splitters and mergers are connected together according to the connectivity table.

Figure 8:
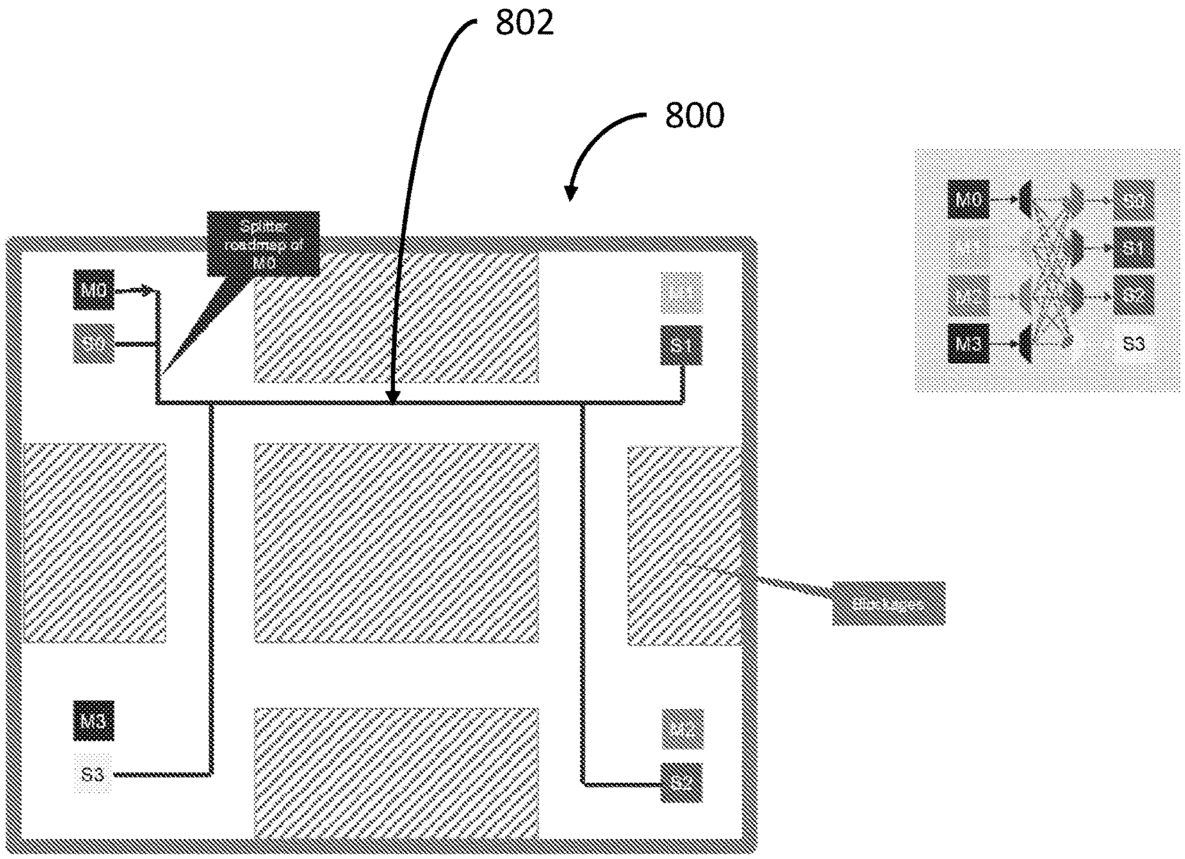
FIG. 8 shows a roadmap in a floorplan for one initiator of the network of FIG. 6 in accordance with the various aspects and embodiments of the invention.

Referring now to FIG. 8, a floorplan 800 is shown in accordance with the various aspects of the invention. The sequencer 250 has an input 256 representing a roadmap creation between each initiator and target. The floorplan 800 includes a physical path 802 that is computed between an initiator interface (M0) on the floor plan, and each of its connected targets, such as target S0, target S1, target S2, and target S3. The path 802 is called the splitter roadmap of the initiator M0; while not shown, every initiator will have a splitter roadmap. The tool uses any algorithm suitable for finding a path between a source point and multiple destination points, including algorithms that minimize the length of the paths.

Figure 9:
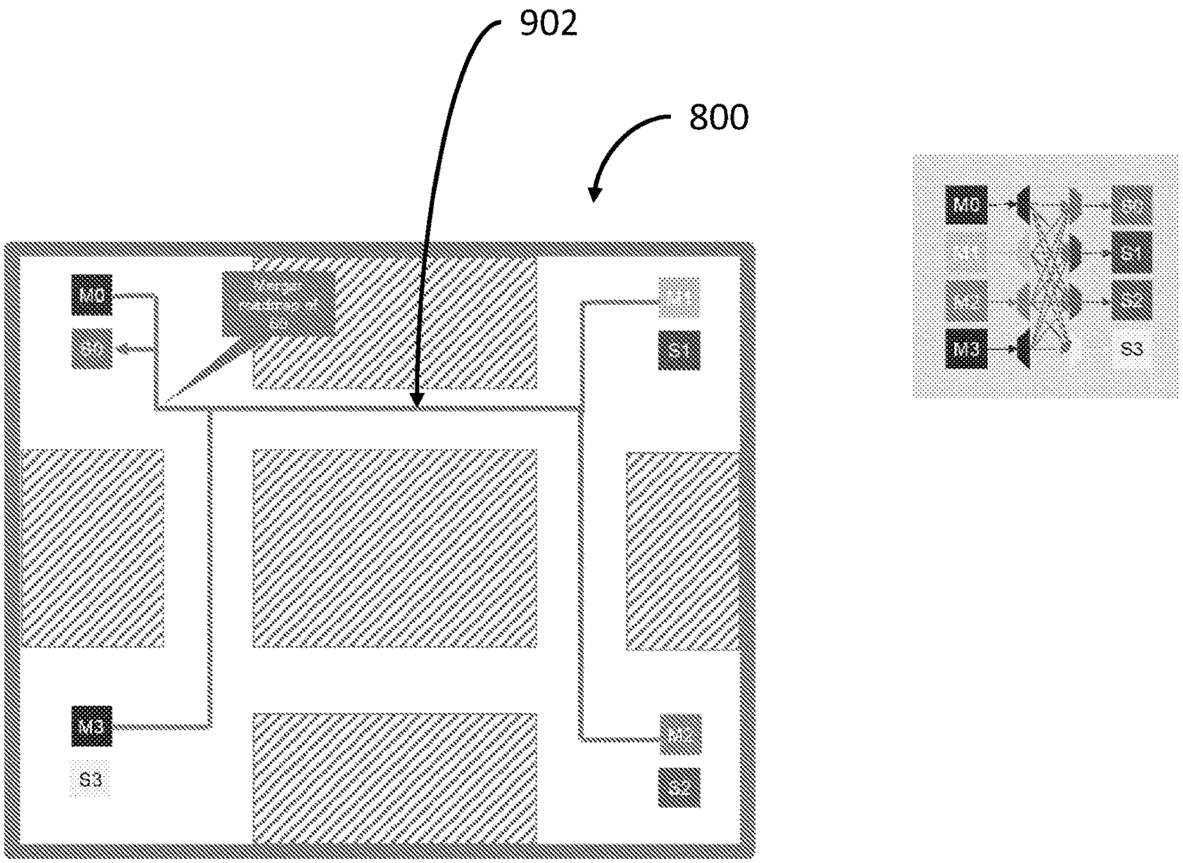
FIG. 9 shows a roadmap in a floorplan for one target of the network of FIG. 6 in accordance with the various aspects and embodiments of the invention.

Referring now to FIG. 9, the floorplan 800 has computed a physical path 902 between a target interface for the target S0 on the floorplan and each of its connected initiators. The path 902 is a merger roadmap of the target S0. As will be apparent, every target will have a merger roadmap. The tool uses any algorithm suitable to finding a path between multiple source points and a destination point can be used, including algorithms that minimize the length of the paths. In accordance with the various aspects of the invention, the tool transforms the network in a way that maintains its functionality and adds location information to the network elements.

Figure 10:
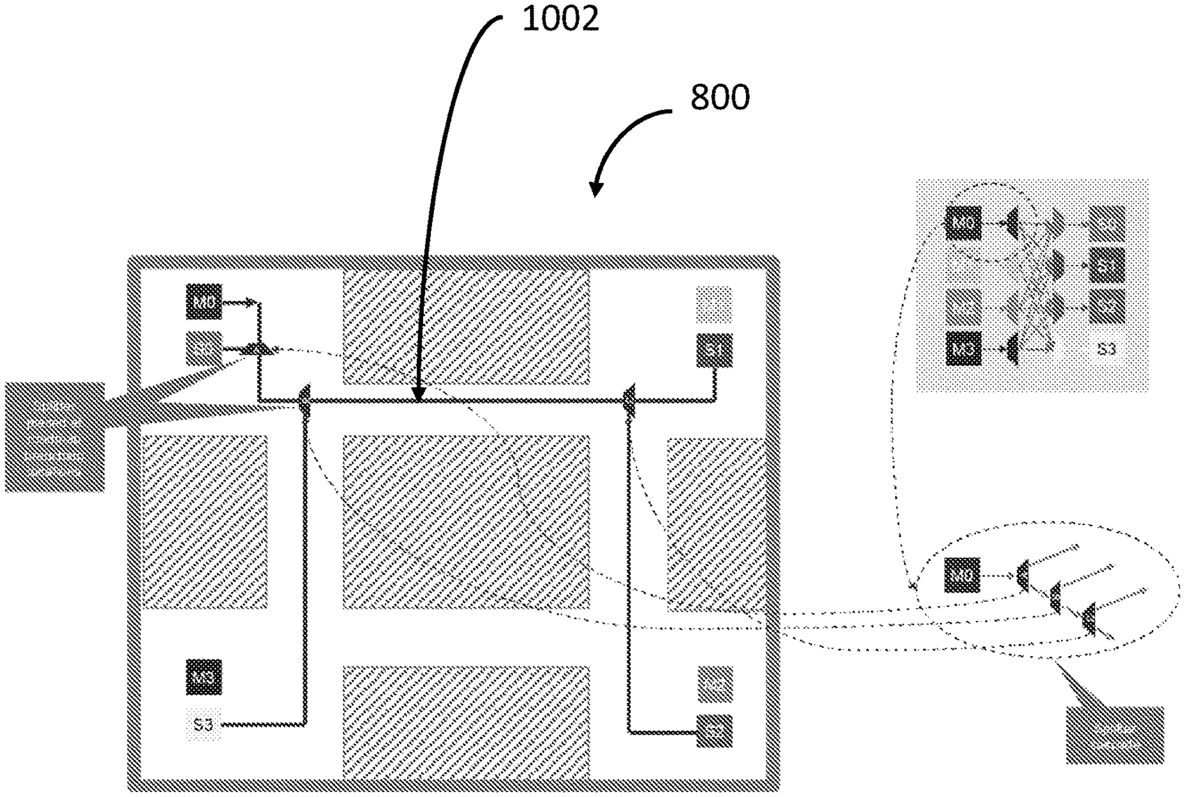
FIG. 10 shows decomposition of a main node splitter into a cascade of splitters distributed physically along the roadmap of FIG. 8 in accordance with the various aspects and embodiments of the invention.

Referring now to FIG. 10, the floorplan 800 is shown with a path 1002 in accordance with the various aspects of the invention. The sequencer 250 has an input 258 that provides physical distribution of splitters and mergers on the roadmap. Using the tool, each switch is decomposed into mergers and splitters. Using the tool, each splitter in the main switch is decomposed further into a cascade of splitters and each splitter of the cascade being placed on a branching point of the splitter roadmap of the attached initiator. The branching point of the roadmap is defined by the fact that the path is being split into two or more branches.

Figure 11:
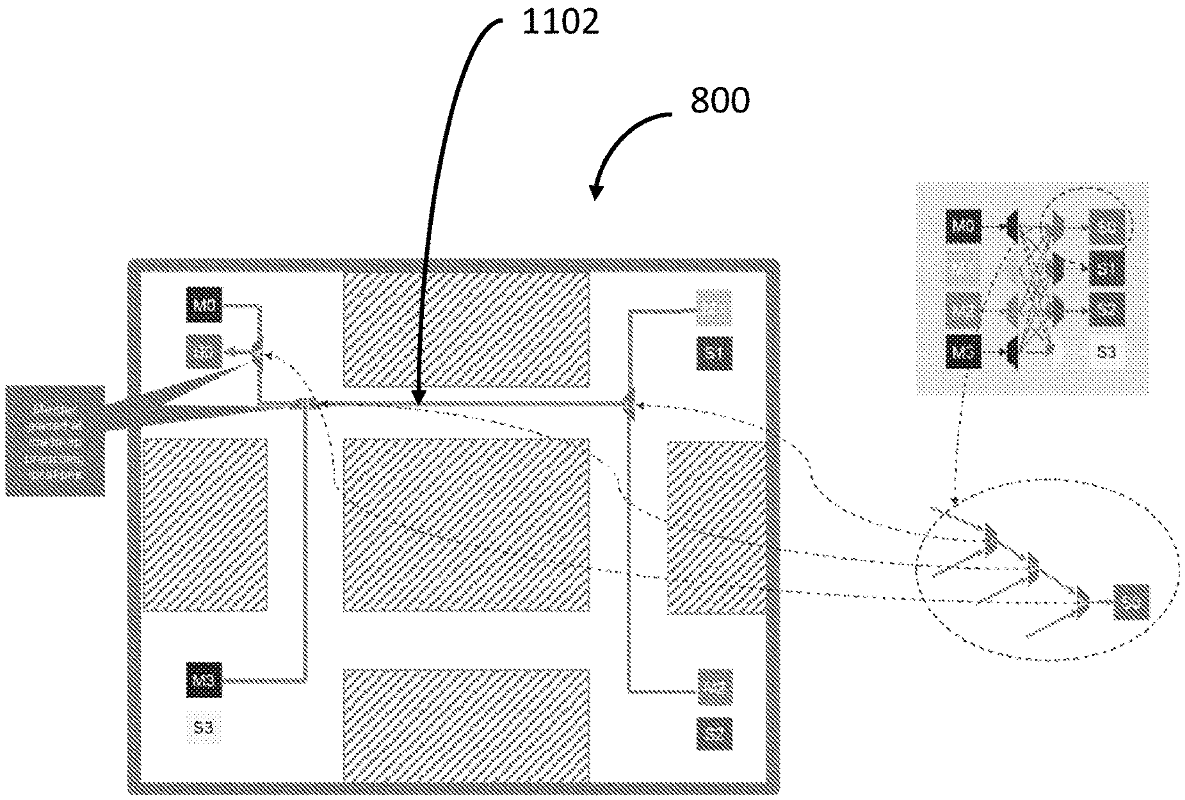
FIG. 11 shows decomposition of a main node merger into a cascade of mergers distributed physically along the roadmap of FIG. 9 in accordance with the various aspects and embodiments of the invention.

Referring now to FIG. 11, the floorplan 800 is shown with a path 1102 in accordance with the various aspects of the invention. Using the tool, each switch for each of the mergers in the main switch is decomposed further into a cascade of mergers, each merger of the cascade being placed on a branching point of the merger roadmap of the attached target. The branching point of the roadmap is defined by the fact that the path is being split into two or more branches. The process of decomposing a splitter in a cascade of splitters preserves the original splitter functionality, as the number of inputs to the cascade is still one, and the number of outputs of the cascade is identical to the number of outputs of the original splitter. The process of decomposing a merger in a cascade of mergers preserves the original merger functionality, as the number of outputs of the cascade is still one, and the number of inputs to the cascade is identical to the number of inputs to the original merger. In accordance with the various aspects of the invention, the effect of the process is to obtain a set of elementary switches, which are represented by the mergers and the splitters, that are physically placed close to where the actual connections between switches need to be.

In accordance with the various aspects of the invention, the tool transforms the network in order to reduce the number of wires used between switches achievable, while keeping the performance as defined in the scenarios, which are a set of required minimum throughput between initiator and target. In accordance with the various aspects of the invention switches are clustered for performance aware switching, mergers and splitters that have been distributed on the roadmaps are treated like ordinary switches.

In accordance with an aspect of the invention, the tool uses a process that is iterative and will merge switches under the condition that performances are still met, until no further switch merge can occur. The tool uses a process that is described as follows:

1) While no more switch fusion is possible, do the following:

a) Select a candidate switch for fusion with one of its neighbors. The selection process ensures all switches in the network are eventually candidates.

b) When a candidate is selected, search for a neighbor to fusion with. The neighboring criteria is based on evaluation of a cost function. The cost function shall return a switch that is "best suited" to fusion with the candidate. The definition of "best suited" is implementation dependent, but the cost functions shall be such that the potential fusion of the two switches maximizes the gain in terms of at least one metric including: congestion; wire length; logic area; power; and performances, etc.

c) Test if, in case the fusion happens, that the performance scenarios will still all meet the minimum throughput requirements. If not, then these two switches cannot be merged. The process executed by the tool searches for another neighbor until either no more neighbors can be found, in which case all switches are left intact, or one neighbor is found that can be merged with the candidate without violating the minimum throughput requirements of all scenarios, in which case the network is modified by merging the candidate switch with the neighbor.

In accordance with various aspects of the invention, it is possible for the process to ensure the switches do not grow above a certain size (maximum number of ingress ports, maximum number of egress ports). If a combined switch is above the set threshold, then the merge is prevented.

Figure 12:
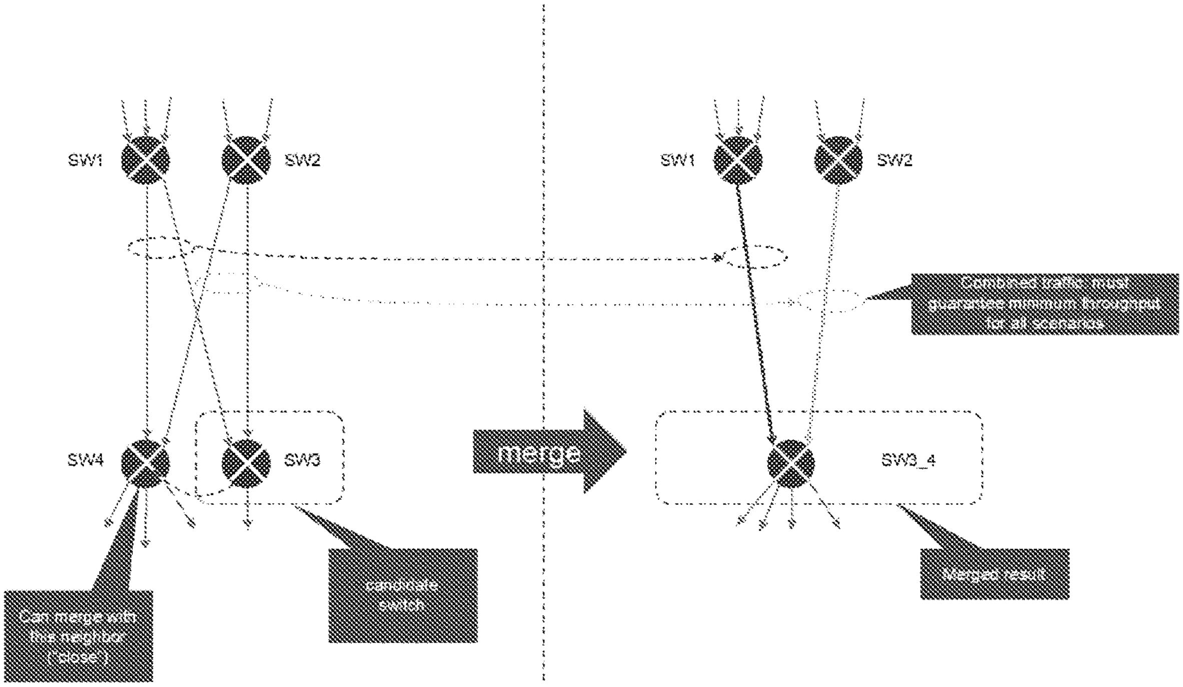
FIG. 12 shows an example of two nodes that are close and merged in accordance with the various aspects and embodiments of the invention.

Referring now to FIG. 12, candidate switch SW3 is shown next to switch SW4 for the merger, in accordance with the various aspects of the invention. The sequencer 250 has an input 260 that provides performance aware switching clustering. The tool executes a process for merging two switches. When the switches are merged, the wires that were going from different switches are simplified into one wire from each connected switch to the combined switch. In accordance with the various aspects of the invention, switches SW3 and SW4 are merged. The connections between SW1 and SW4 and SW3, are combined and replaced by a single connection between SW1 and SW3_4. Thus, long connections between distant switches are removed and reduced to a minimum, while connections between close switches are removed and done inside the switch themselves.

Referring again to FIG. 2B, an input 262 to the sequencer 250 includes various optimizations that can be performed to further reduce the number of wires used by the network, the area of the network elements, and the power consumed by network elements. Examples of such optimization include: detection of links that can be removed because they are not used, or their traffic can be re-routed; reducing the width of a link if the link is wider than required by the scenarios; and performing wire length optimization through finding an optimal placement of all the switch elements that minimizes the total wire length of the network, wherein the total wire length of the network is the sum of the distance spanned by each connection between network elements times the width of that connection.

Continuing with FIG. 2B, an input 264 to the sequencer 250 includes producing a legal NoC by modifying the location of the network elements so that the network elements fit in the allocated free space and do not overlap, and they exist in the corresponding clock and power domain limits. In accordance with various aspects of the invention, the area occupied on the die by each network element is computed using the information provided regarding the capabilities of the technology, such as the area of a reference logic gate. Then each element is tested for correctness of its placement (enough free space exists for the element, no other element overlaps). If the test fails, the element is moved until a suitable location is found where the test passes.

In accordance with other aspects of the invention, extension of clock and power domains on the floorplan are provided and each element is tested to ensure it is located within the bounds of the specified clock and power domain. If the test fails, the element is moved until a suitable location is found where the test is passing. Once a suitable placement has been found for each element, a routing is done of each connection between elements. The routing process will find a suitable path for the set of wires making the connections between elements. After routing is done, distance-spanning pipeline elements are inserted on the links if required, using the information provided regarding the capabilities of the technology, based on how long it takes for a signal to cover a 1 mm distance.

In accordance with some aspects and embodiments of the invention, the tool generates one or more computer files describing the generated NoC that includes:

- The list of network elements with their configuration: data width, clock domain.
- The position of each generated network element on the floor plan.
- The set of routes through the network elements implementing the connectivity. In accordance with the aspects of the invention, a route is an ordered list of network elements, one for each pair of (initiator, target) and one for each pair of (target, initiator). The route represents how traffic between the pairs will flow and through which elements.

In accordance with various aspects of the invention, the tool is used to generate metrics about the generated NoC, such as: histograms of wire length distribution, number of switches, histogram of switch by size.

In accordance with another aspect of the invention, the tool automatically inserts in the network various adapters and buffers. The tool inserts the adapters based on the adaptation required between two elements that have different data width, different clock and power domains. The tool inserts the buffers based on the scenarios and the detected rate mismatch.

In accordance with some aspects and embodiments, the tool can be used to ensure multiple iterations of the synthesis are done for incremental optimization of the NoC, which includes a situation when one constraint provided to the tool is information about the previous run.

After execution of the synthesis process by the software, the results are produced in a machine-readable form, such as computer files using a well-defined format to capture information. An example of such a format is XML, another example of such a format is JSON. The scope of the invention is not limited by the specific format.

Figure 13:
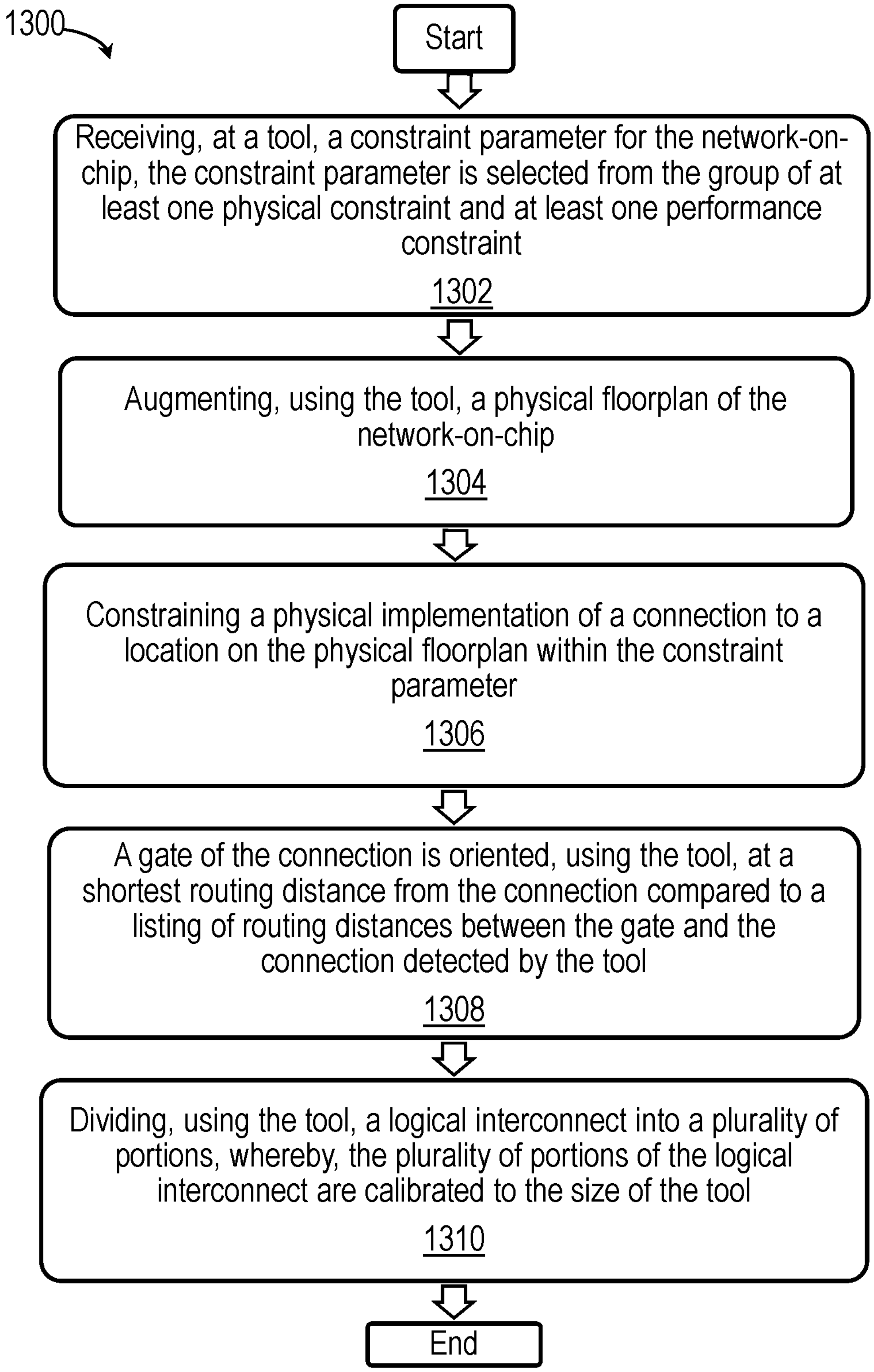
FIG. 13 shows a flow chart illustrating a method for creating a synthesized NoC with data indicating potential guidance for the physical implementation.

FIG. 13 shows a method 1300 executed by a tool that enhances a synthesized NoC with data that acts as guidance for the physical implementation of the synthesized NoC. At step 1302, a constraint parameter for the network is received at the tool, wherein the constraint parameter is selected from a group of constraints, which at least includes physical constraints and performance constraints. At step 1304, the physical floor plan of the NoC is augmented with additional information to help guide the physical implementation. For example, information may be related to placeholders for potential pipelines in the physical floorplan. At step 1306, the tool constraints, based on the augment information added to or for the physical floorplan, a physical implementation of a connection to a location on the physical floorplan within the constraint parameter. At step 1308, a gate of the connection is oriented, using the tool, at a shortest routing distance from the connection compared to a listing of routing distances between the gate and the connection detected by the tool. At step 1310, dividing, using the tool, a logical interconnect into a plurality of portions, whereby, the plurality of portions of the logical interconnect are calibrated to the size of the tool.

Figure 14:
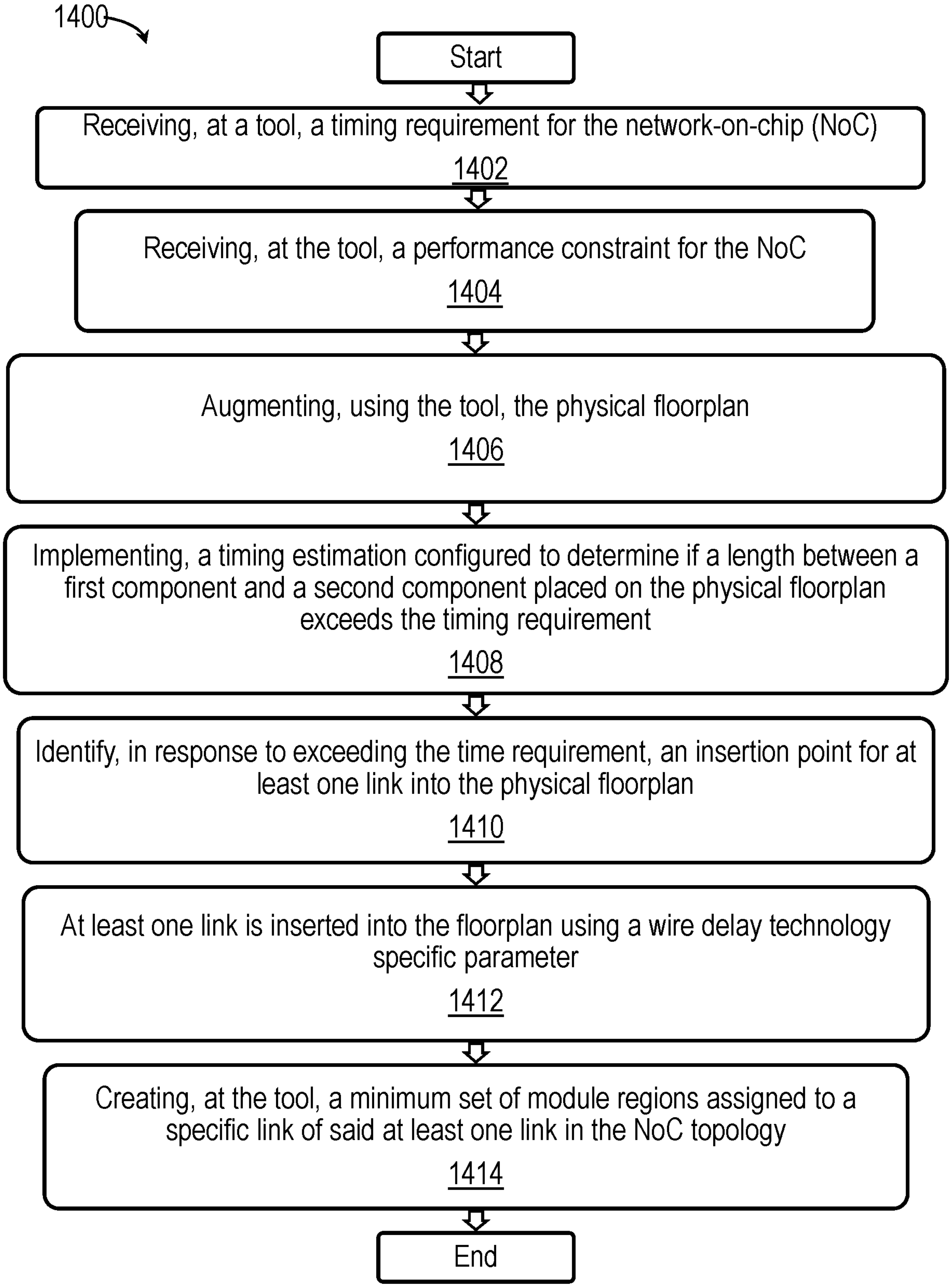
FIG. 14 shows a flow chart illustrating an alternate method for creating a synthesized NoC with data indicating potential guidance for the physical implementation.

FIG. 14 shows a flow chart illustrating an alternate method 1400 used by a tool for creating a synthesized NoC with data indicating potential guidance for the physical implementation. At step 1402, the tool receives a timing requirement for the NoC. At step 1404, the tool receives performance constraints for the NoC. At step 1406, the tool augments the NoC's physical floorplan with information that can be used to guide the implementation of the synthesized NoC. At step 1408, the tool implements a timing estimation configured to determine if a length between a first component and a second component placed on the physical floorplan exceeds the timing requirement (timing constraints). At step 1410, the tool, in response to exceeding the time requirement, identifies a physical insertion point for at least one link into the physical floorplan. At step 1412, at least one link is inserted into the floorplan using a wire delay technology specific parameter in accordance with some aspects and embodiments of the invention. At step 1414, the tool identifies a minimum set of module regions that can be assigned to a specific link of said at least one link of the NoC topology.

Figure 15A:
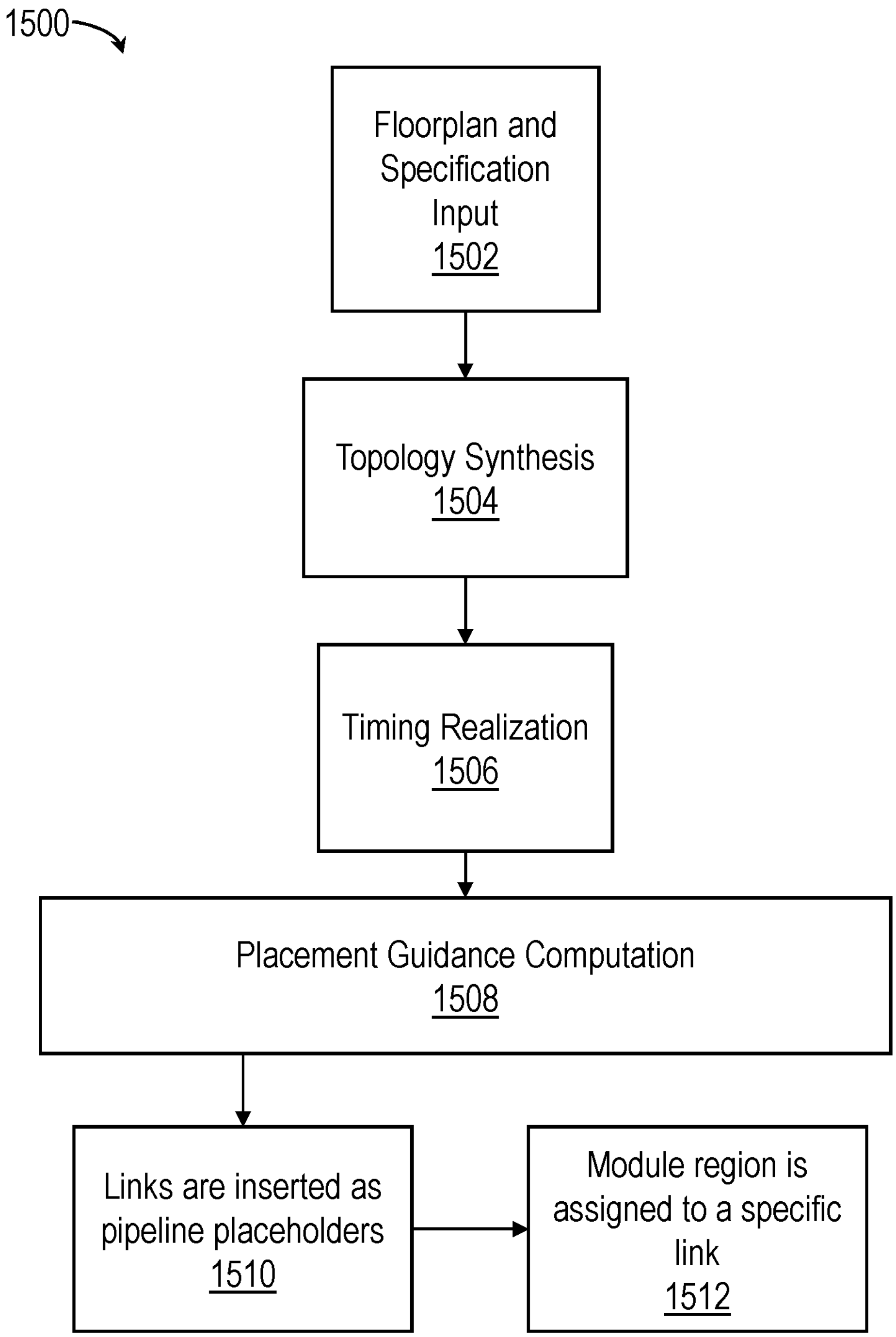
FIG. 15A shows a flow chart of the method in FIG. 14 for synthesizing a chip's topology in accordance with various aspects of the invention.
Figure 15B:
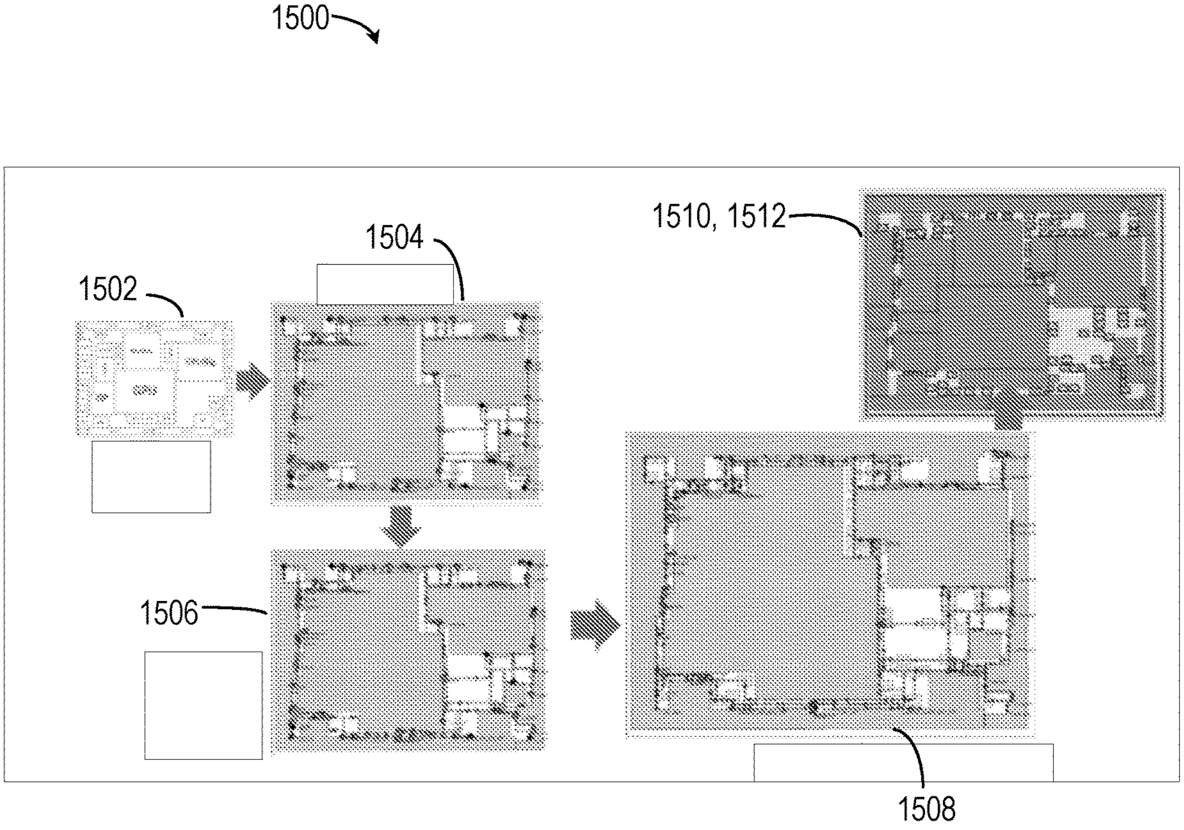
FIG. 15B is an illustration of a diagram of the process in FIG. 15A for synthesizing a chip's topology in accordance with various aspects of the invention.

FIGS. 15A and 15B show the process used by the tool of FIG. 13 and FIG. 14 for physically implementing the synthesized NoC's topology in accordance with various aspects of the invention. Providing any physical implementation tool including, but not limited to, a Synopsys SNPS Design Compiler, with NoC topology information 1502 including, but not limited to, a physical floorplan, location of components, and/or specification input. Routes are produced by topology synthesis (also called NoC generation) 1504 and are configured to traverse through a set of floor plan regions or checkpoints. Mechanism 1506, includes, but is not limited to, a timing realization such as, a distance pipe insertion configured to improve timing between two components. The insertion 1510 of distance pipeline placeholders may use the wire delay technology-specific parameter to insert placeholders for potential pipelines. Using the method, many segments in the network will fall within the legal length for timing closure. In other words, the length between two components is within parameters established in the timing constraints. The placeholder is a regular component of the topology known as a link.

Referring again to FIGS. 15A and 15B, automatic module region creation 1512 facilitates the creation of a minimum set of module regions that are assigned specific links of the topology. The links that were inserted as pipeline placeholders may be reused as checkpoints. For each route, produced by topology synthesis 1504, a new link and corresponding module region is inserted into the physical path when placement guidance computation 1508 detects, based on information 1502, a problem to be avoided. In an example, a new link and corresponding module region are inserted 1510 and 1512 into the physical topology when a predetermined wire distance is traversed between two hops along both X and Y. In other words, the timing requirement is exceeded because the distance between the two components is too great. This process ensures the downstream tool will route the topology wires approximately following the path of the topology synthesis. Further, since the routing is similar, the pipeline placeholders that the topology synthesis process generated have a high probability of reducing timing violations in the final design.

It is more desirable to guide the physical implementation tool to place NoC topology in a new way that is similar to the topology synthesis result, while still enabling the physical implementation tool enough flexibility to move logic elements as needed. Rather than enforcing exact positions for switches, the routes traverse a set of floor plan regions or checkpoints.

In an embodiment, a mechanism for accommodating timing realization between a first component and a second component within a NoC, includes, but is not limited to, distance pipe insertion, adding buffer stages, switching buffers to higher drive or faster buffers, adjustments to wire widths, and/or indication to which wire layer(s) are being used.

It is within the scope of this invention for different mechanisms to be physically implemented to overcome timing issues within a synthesized topology, resolving timing issues prior to their occurrence by communicating constraints and/or guidance for the physical implementation. It is within the scope of this invention for physical implementation of a connection to include, but not be limited to, a physical placement of an object, a component and/or a gate around the NoC topology so that a downstream tool does not place a first connection at a great enough distance away from a second connection, so as to exceed a time restraint. It is more desirable to synthesize a network for all of the connections capable of satisfying connectivity requirements and to minimize the number of gates in the synthesized network. It is important to minimize the number of gates in the synthesized network for including, but not limited to, enabling the NoC to fit within the topology parameters; ensuring the timing requirement can be met; building more efficiently in smaller networks; and minimizing the overall power used in the interconnect between signals.

In another embodiment, components of the driving side are replaced with components having greater drive strength to increase speed. For example, when a signal is forwarded from a first switch to a second switch, the timing requirement is exceeded because the distance between the first switch and the second switch is too great, a distance pipe may be placed in between the first switch and the second switch or the drive strength may be increased to make the signal faster by using larger wires having a lower resistance to reduce the parasitic elements on the particular line.

In an embodiment, a floorplan region is a mechanism capable of including, but not limited to; constraining a component, such as a switch and/or a distance pipe stage to a physical location and/or an approximate physical location; and/or dividing a logical interconnect into a plurality of portions that are tuned to the size of the downstream tools for proper synthesis. The physical and logical configuration of the interconnects are configured together to form a logical interconnect. The floorplan regions are used to constrain a component to a particular location. The need for a floorplan region is a response to the increasing size of the network or interconnect of SoCs that are being developed. In other words, the network or interconnect of SoCs have grown larger than downstream implementation tools capacity including, but not limited to, the addition of wider interconnects and/or more components being interconnected.

In a first aspect, it may be more desirable to have a switch in a particular constrained location, based on the data associated with signals being received and transmitted by the switch, because the performance of the switch may be adversely affected if the switch was moved to a location out of the constrained location.

In a second aspect, an additional constraint may be utilized to place, for example, gates of a component for a switch or a pipe stage, as close together as possible within each individual component. A current problem in existing placement programs is their tendency to place components too far away from each other. It is within the scope of this invention for a switch being a single component having a plurality of gates, with each gate having a need to be placed. Although the netlist facilitates the interconnection of these components, the downstream tools physically place the components and make the routes to connect the logical connectivity specified.

In a third aspect, the two separate constraints of the first aspect and the second aspect may be used simultaneously. For example, if a switch that is specified to have a particular performance has the components of that switch distributed over a larger area than specified, the switch will have a lower performance than originally specified. Thus, it would be more desirable to keep components of this switch close together, to each other. Further, based on a larger network, it is more desirable to keep components within a particular region or area of the floorplan free space so that the overall network will perform as specified or analyzed.

In an embodiment, approximations in a given semiconductor process, a maximum length of a single wire is established to ensure that the overall timing of that particular path can be met. Further, it is an important aspect to move from a first component to a second component within a given amount of time. Due to an excessive length between a first component and a second component it may not be achievable to move a signal from the first component to the second component within the given amount of time. As a result, the need for the technical solution of an insertion of distance pipe stages would solve this technical problem, as compared to current techniques.

In an embodiment, receiving an area-estimation for the first component and the second component, and balancing the timing and other performance requirements in the optimization of the NoC so as to ensure the resulting NoC gates will be placeable, that is, they will fit into the free space in the floorplan allotted to the NoC.

In an embodiment, further receiving a power requirement for the NoC, and balancing the timing and other performance requirements in the optimization of the NoC so as to ensure the resulting NoC will not exceed the power requirement specified in the constraint.

In an embodiment, further incorporating physical routing congestion data, either as an estimation based on the NoC netlist structure, or obtained as feedback from the downstream implementation tools, and balancing the timing and other performance requirements in the optimization of the NoC so as to ensure the resulting NoC will be routable in the free space in the floorplan allotted to the NoC.

In accordance with some aspects and embodiments of the invention, a method is disclosed for guiding physical generation of a NoC from a synthesized representation. The includes receiving, at a tool, at least one constraint parameter for the NoC, the at least one constraint parameter is selected from a group of constraint parameters including at least one physical constraint and at least one performance constraint; augmenting, using the tool, a physical floorplan for the NoC with information that guides a physical implementation of the NoC; and constraining, using the physical floorplan, the physical implementation of a connection to a location on the physical floorplan based on the at least one constraint parameter.

In accordance with some aspects and embodiments of the invention, a method is disclosed wherein a gate of the connection is oriented, using the tool, at a shortest routing distance from the connection compared to a listing of routing distances between the gate and the connection detected by the tool.

In accordance with some aspects and embodiments of the invention, a method is disclosed that includes dividing, using the tool, a logical interconnect into a plurality of portions, whereby, the plurality of portions of the logical interconnect are calibrated to a size of the tool.

In accordance with some aspects and embodiments of the invention, a method is disclosed for guiding a physical implementation of a synthesized topology of a NoC. The method includes receiving, at a tool, at least one timing requirement for the NoC; receiving, at the tool, at least one performance constraint for the NoC; augmenting, using the tool, a physical floorplan for the NoC with information to guide the physical implementation; implementing a timing estimation configured to determine if a length between a first component and a second component placed on the physical floorplan exceeds the at least one timing requirement; and inserting, in response to exceeding the at least one timing requirement, at least one link in the physical floorplan.

In accordance with some aspects and embodiments of the invention, a method is disclosed, wherein the at least one link is inserted using a wire delay technology-specific parameter. In accordance with some aspects and embodiments of the invention, a method is disclosed further comprising creating, at the tool, at least one module region, wherein the at least one link of the NoC is assigned to the at least one module region.

In accordance with some aspects and embodiments of the invention, a method is disclosed that includes receiving an area-estimation for the first component and the second component.

In accordance with some aspects and embodiments of the invention, a method is disclosed that includes performing a balance to the at least one timing requirement in an optimization of the NoC to identify that at least one gate of the NoC can be placeable into at least a portion of the physical floorplan.

In accordance with some aspects and embodiments of the invention, a method is disclosed that includes performing a balance to the at least one performance constraint in an optimization of the NoC to identify that at least one gate of the NoC can be placeable into at least a portion of the physical floorplan.

In accordance with some aspects and embodiments of the invention, a method is disclosed that includes receiving a power requirement for the NoC.

In accordance with some aspects and embodiments of the invention, a method is disclosed that includes performing a balance to the at least one timing requirement in an optimization of the NoC to identify that the NoC will not exceed the power requirement specified in the at least one timing requirement.

In accordance with some aspects and embodiments of the invention, a method is disclosed that includes performing a balance to the at least one performance constraint in an optimization of the NoC to identify that the NoC will not exceed the power requirement specified in the at least one performance constraint. In accordance with some aspects and embodiments of the invention, a method is disclosed that includes providing physical routing congestion data.

In accordance with some aspects and embodiments of the invention, a method is disclosed that includes performing a balance to the at least one timing requirement in an optimization of the NoC to identify that the NoC can be routable into at least a portion of the physical floorplan.

In accordance with some aspects and embodiments of the invention, a method is disclosed that includes performing a balance to the at least one performance constraint in an optimization of the NoC to identify that at least one gate of the NoC can be routable into at least a portion of the physical floorplan.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various examples.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example and in accordance with the various aspects and embodiments of the invention, IP elements or units include: processors (e.g., CPUs or GPUs), RAM—e.g., off-chip dynamic RAM or DRAM, a network interface for wired or wireless connections such as ethernet, Wi-Fi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-field protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments shown and described herein. Rather, the scope and spirit of present invention is embodied by the appended claims.

What is claimed is:

1. A method for guiding physical generation of a NoC from a synthesized representation, the method comprising:

receiving, at a tool, at least one constraint parameter for the NoC, the at least one constraint parameter is selected from a group of constraint parameters including at least one physical constraint and at least one performance constraint;

augmenting, using the tool, a physical floorplan for the NoC with information, which meets performance criteria supplied, that guides a physical implementation of the NoC and wherein the information includes placeholders for potential pipelines in the physical floorplan; and constraining, using the physical floorplan, the physical implementation of a connection, which is guided by the information, to a location on the physical floorplan based on the at least one constraint parameter.

2. The method of claim 1, wherein a gate of the connection is oriented, using the tool, at a shortest routing distance from the connection compared to a listing of routing distances between the gate and the connection detected by the tool.

3. The method of claim 1 further comprising dividing, using the tool, a logical interconnect into a plurality of portions, whereby, the plurality of portions of the logical interconnect are calibrated to a size of the tool.

4. A method for guiding a physical implementation of a synthesized topology of a NoC, the method comprising:

receiving, at a tool, at least one timing requirement for the NoC;

receiving, at the tool, at least one performance constraint for the NoC;

augmenting, using the tool, a physical floorplan for the NoC with information, which meets performance criteria, to guide the physical implementation and includes placeholders for potential pipelines in the physical floorplan;

implementing a timing estimation configured to determine if a length between a first component and a second component placed on the physical floorplan exceeds the at least one timing requirement; and inserting, in response to exceeding the at least one timing requirement, at least one link in the physical floorplan.

5. The method of claim 4, wherein the at least one link is inserted using a wire delay technology-specific parameter.

6. The method of claim 4 further comprising creating, at the tool, at least one module region, wherein the at least one link of the NoC is assigned to the at least one module region.

7. The method of claim 4 further comprising receiving an area-estimation for the first component and the second component.

8. The method of claim 7 further comprising performing a balance to the at least one timing requirement in an optimization of the NoC to identify that at least one gate of the NoC can be placeable into at least a portion of the physical floorplan.

9. The method of claim 7 further comprising performing a balance to the at least one performance constraint in an optimization of the NoC to identify that at least one gate of the NoC can be placeable into at least a portion of the physical floorplan.

10. The method of claim 4 further comprising receiving a power requirement for the NoC.

11. The method of claim 10 further comprising performing a balance to the at least one timing requirement in an optimization of the NoC to identify that the NoC will not exceed the power requirement specified in the at least one timing requirement.

12. The method of claim 10 further comprising performing a balance to the at least one performance constraint in an optimization of the NoC to identify that the NoC will not exceed the power requirement specified in the at least one performance constraint.

13. The method of claim 4 further providing physical routing congestion data.

14. The method of claim 13 further comprising performing a balance to the at least one timing requirement in an optimization of the NoC to identify that the NoC can be routable into at least a portion of the physical floorplan.

15. The method of claim 13 further comprising performing a balance to the at least one performance constraint in an optimization of the NoC to identify that at least one gate of the NoC can be routable into at least a portion of the physical floorplan.

* * * * *